US012639664B2

(12) United States Patent
Noll et al.

(10) Patent No.: US 12,639,664 B2
(45) Date of Patent: May 26, 2026

(54) REAL-TIME DETECTION OF METRIC ANOMALIES FOR A RETAIL ENVIRONMENT

(71) Applicant: Target Brands, Inc., Minneapolis, MN (US)

(72) Inventors: Travis James Noll, St. Paul, MN (US); Venkata Rao Putrevu, Maple Grove, MN (US); Grady Michael Johnson, Eden Prairie, MN (US); Katherine Ann Sorensen, Elk River, MN (US); Venkata Naga Anitha Ganta, Plymouth, MN (US); Alexander Jacques Bates, St. Paul, MN (US); Kristen Sullivan, Zimmerman, MN (US); Rachel Lin Alderman, Hanover, MN (US)

(73) Assignee: Target Brands, Inc., Minneapolis, MN (US)

( * ) Notice: Subject to any disclaimer, the term of this patent is extended or adjusted under 35 U.S.C. 154(b) by 176 days.

(21) Appl. No.: 18/416,020

(22) Filed: Jan. 18, 2024

(65) Prior Publication Data

US 2025/0238754 A1     Jul. 24, 2025

(51) Int. Cl.
*G06Q 10/087*        (2023.01)
*G06Q 30/0202*      (2023.01)
(52) U.S. Cl.
CPC ....... *G06Q 10/087* (2013.01); *G06Q 30/0202* (2013.01)

(58) Field of Classification Search
CPC ......................... G06Q 10/087; G06Q 30/0202
See application file for complete search history.

(56) References Cited

U.S. PATENT DOCUMENTS 6,731,990 B1    5/2004  Carter et al.
8,386,285 B2    2/2013  Chen et al.
(Continued)

OTHER PUBLICATIONS

Apache Spark [online], "Running Spark on Yarn," [retrieved on Jan. 17, 2024], retrieved from: URL<http://spark.apache.org/docs/latest/running-on-yarn.html>, 17 pages.
(Continued)

*Primary Examiner* — Garcia Ade
(74) *Attorney, Agent, or Firm* — Barnes & Thornburg LLP

(57)        ABSTRACT

The disclosed system provides real-time detection and remediation of metric anomalies in a replenishment network. A computer system can receive, from data sources, event data, retrieve historic metric data associated with a metric of a retail environment, aggregate the event data and historic metric data into aggregated data for the metric, store the aggregated data in a cache data store, determine, based on applying a statistical algorithms model to the cached aggregated data, (i) a predicted metric value and (ii) upper and lower tolerance bounds for the metric, iteratively receive the event data, aggregate the data, and determine (i) and (ii) until (a) determining a condition is triggered to evaluate the metric or (b) expiration of a time period to which the predicted value and the upper and lower tolerances apply, and return, based on determining the condition is triggered to evaluate the metric, information about metric anomalies.

20 Claims, 10 Drawing Sheets

(56) References Cited

U.S. PATENT DOCUMENTS

| | | | |
|---|---|---|---|
| 8,751,436 B2 * | 6/2014 | Lowry | G06Q 40/00 |
| | | | 706/52 |
| 9,460,401 B2 | 10/2016 | Zeng et al. | |
| 9,495,645 B2 | 11/2016 | Hughes et al. | |
| 10,430,812 B2 | 10/2019 | Wang et al. | |
| 11,017,330 B2 * | 5/2021 | Dodson | G06Q 10/04 |
| 11,487,756 B1 | 11/2022 | Veeravu et al. | |
| 11,526,899 B2 | 12/2022 | Ouellet et al. | |
| 11,551,184 B2 | 1/2023 | Acharya et al. | |
| 2015/0317589 A1 | 11/2015 | Anderson et al. | |
| 2016/0005055 A1 | 1/2016 | Sarferaz | |
| 2016/0299957 A1 | 10/2016 | A.C. et al. | |
| 2017/0132520 A1 | 5/2017 | Burroughs et al. | |
| 2023/0351322 A1 * | 11/2023 | Sharma | G06Q 30/0202 |
| 2024/0256960 A1 * | 8/2024 | Ma | G06N 20/00 |

OTHER PUBLICATIONS

IBM Knowledge Center [ online], "Lesson 3: Configuring generic connector," [retrieved on Jan. 17, 2024], retrieved from: URL<https://www.ibm.com/support/knowledgecenter/SSULQD_1.7.2/com.ibm.nz.hdp.doc/tt_dc_lesson2.html>, 2 pages.

IBM Knowledge Center [ online], "Lesson 5: Lesson 5: Using Fluid Query functions to query data," [retrieved on Jan. 17, 2024], retrieved from: URL<https://www.ibm.com/support/knowledgecenter/SSULQD_1.7.2/com.ibm.nz.hdp.doc/tt_dc_lesson5.html>, 2 pages.

* cited by examiner

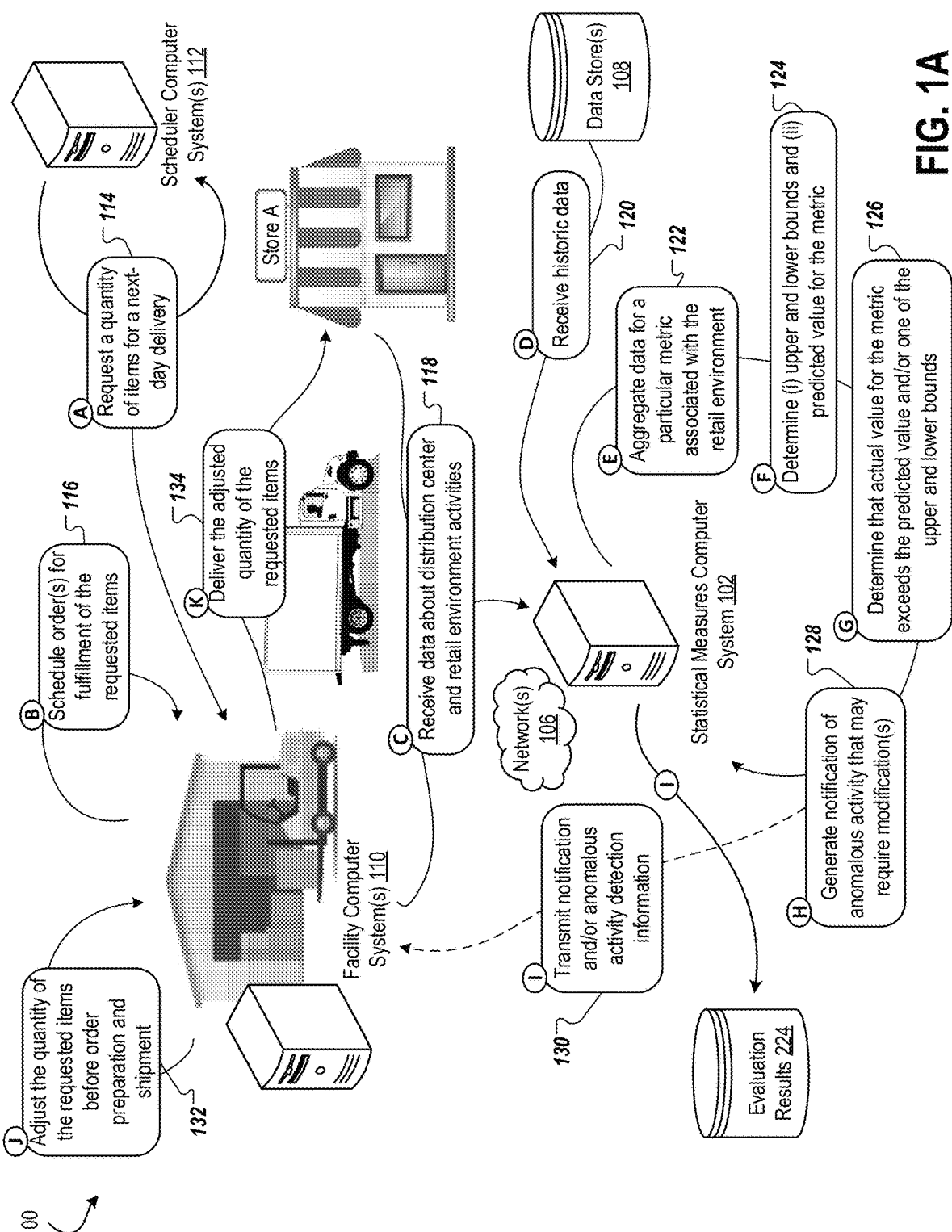

100

Scheduler Computer System(s) 112

A  Request a quantity of items for a next-day delivery  114

Store A

B  Schedule order(s) for fulfillment of the requested items  116

K  Deliver the adjusted quantity of the requested items  134

C  Receive data about distribution center and retail environment activities  118

Facility Computer System(s) 110

J  Adjust the quantity of the requested items before order preparation and shipment  132

Network(s) 106

Data Store(s) 108

D  Receive historic data  120

E  Aggregate data for a particular metric associated with the retail environment  122

F  Determine (i) upper and lower bounds and (ii) predicted value for the metric  124

G  Determine that actual value for the metric exceeds the predicted value and/or one of the upper and lower bounds  126

Statistical Measures Computer System 102

H  Generate notification of anomalous activity that may require modification(s)  128

I  Transmit notification and/or anomalous activity detection information  130

Evaluation Results 224

FIG. 1A

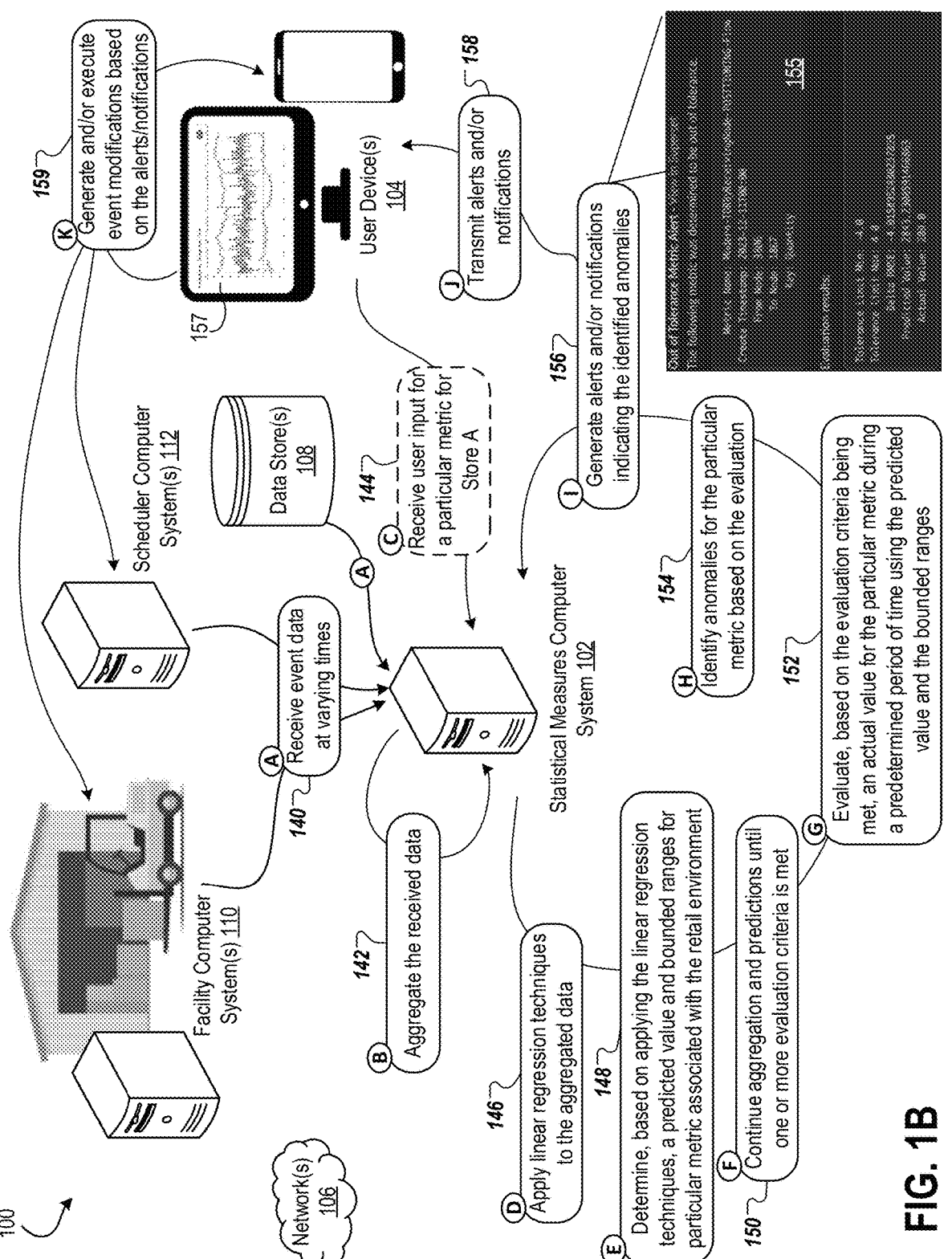

FIG. 1B

K 159 Generate and/or execute event modifications based on the alerts/notifications User Device(s) 104

J 158 Transmit alerts and/or notifications

155

Scheduler Computer System(s) 112

Data Store(s) 108

C 144 Receive user input for a particular metric for Store A

I 156 Generate alerts and/or notifications indicating the identified anomalies Facility Computer System(s) 110

A 140 Receive event data at varying times

Statistical Measures Computer System 102

H 154 Identify anomalies for the particular metric based on the evaluation

B 142 Aggregate the received data

G 152 Evaluate, based on the evaluation criteria being met, an actual value for the particular metric during a predetermined period of time using the predicted value and the bounded ranges Network(s) 106

D 146 Apply linear regression techniques to the aggregated data

E 148 Determine, based on applying the linear regression techniques, a predicted value and bounded ranges for particular metric associated with the retail environment

F 150 Continue aggregation and predictions until one or more evaluation criteria is met

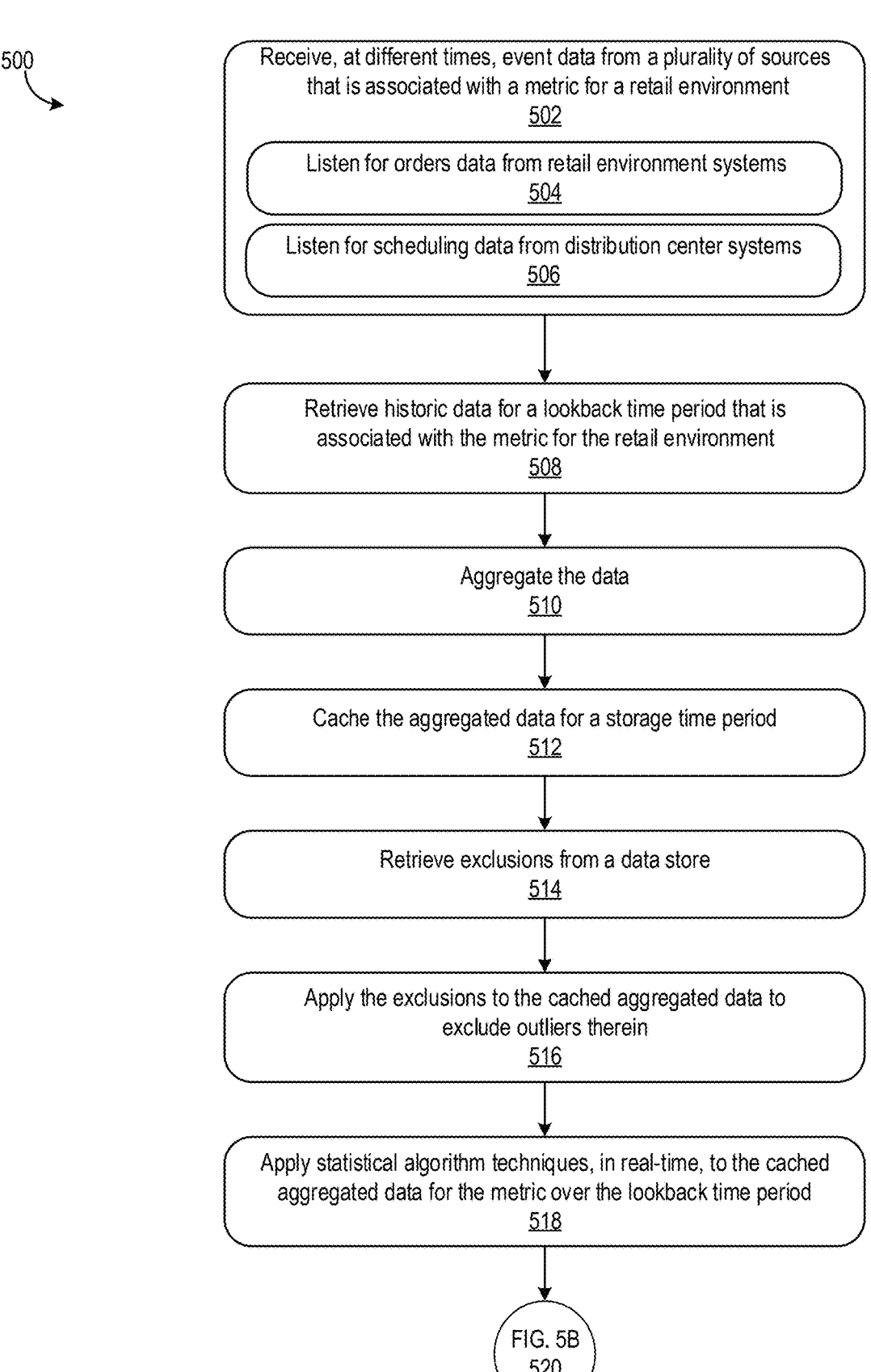

500

Receive, at different times, event data from a plurality of sources that is associated with a metric for a retail environment
502

Listen for orders data from retail environment systems
504

Listen for scheduling data from distribution center systems
506

Retrieve historic data for a lookback time period that is associated with the metric for the retail environment
508

Aggregate the data
510

Cache the aggregated data for a storage time period
512

Retrieve exclusions from a data store
514

Apply the exclusions to the cached aggregated data to exclude outliers therein
516

Apply statistical algorithm techniques, in real-time, to the cached aggregated data for the metric over the lookback time period
518

REAL-TIME DETECTION OF METRIC ANOMALIES FOR A RETAIL ENVIRONMENT

TECHNICAL FIELD

This disclosure generally describes devices, systems, and methods related to aggregating and caching metric data for a retail environment (such as a store) to be used in real-time linear regression prediction of metric bounds and identification/detection of metric anomalies, which can be alerted and addressed before those anomalies cause disruptions in a replenishment process of the retail environment.

BACKGROUND

Retail environments, such as stores, may offer various types of items for sale. As the items are sold and taken off shelves in the retail environments, the retail environments may require those items to be replenished and re-stocked. Accordingly, the retail environments can submit orders to replenish the items. The orders can be submitted to distribution centers, or other types of storage facilities, warehouses, etc., that can be in a distribution range or zone for the retail environments.

Replenishing items from distribution centers to retail environments can be a complex process that requires a balance of various predictable and unpredictable factors. Complexity in the process may cause unexpected issues, delays, and/or changes in costs to the retail environments requesting the items and other relevant stakeholders.

SUMMARY

The disclosure generally describes technology for efficiently aggregating and caching large volumes of metric data for a retail environment (such as a store) to be used in real-time linear regression prediction of metric bounds and identification/detection of metric anomalies, which can be automatically alerted and remedied before those anomalies cause disruptions in a replenishment process of the retail environment. More specifically, the disclosed technology can perform aggregations of real-time and historic data about a particular retail environment through a linear regression algorithm/model to generate a prediction for a metric associated with that retail environment. The prediction for the metric can be dynamically generated, and can include not only a predicted or expected value for a future time period (e.g., prediction for next 24 hours), but it can also include predicted ranges for the metric within which normal or non-anomalous variation is expected to occur. Values falling outside of the predicted ranges can be flagged as anomalous (e.g., indicating a potentially significant error in one or more systems), prompting automatic alerting and resolution. For example, the linear regression techniques can be used to determine a range of expected values for the predicted metric (e.g., a bounded range of expected values). For instance, an evaluated metric can be a quantity of items the retail environment is going to receive or the quantity of items that was ordered to the retail environment. The disclosed technology can dynamically determine the predicted value and bounded ranges (e.g., upper and lower bounds) for this evaluated metric, and without requiring manual estimations or static bounded ranges that may not accommodate for changes over time to that metric. The predicted value and the bounded ranges may then be used to evaluate an actual value for the metric during a predetermined period of time to identify anomalies associated with that metric. The anomalies may be provided to relevant users so that those anomalies can be remedied/avoided by various intervening actions.

As an illustrative example, the disclosed technology may identify an anomaly as a store putting in a replenishment order for 500 items and a distribution center scheduling the replenishment order with 5,000 items. Using the disclosed technology, this anomaly can be flagged early on, before the distribution center begins preparing the order so that the schedule(s) can be corrected/modified before the items are prepared for and/or delivered to the store. For example, the order can be modified before, during, and/or once the order is transmitted to a computing system of the distribution center, such as a warehouse management system (WMS) (but before tasks are generated for relevant workers in the distribution center to begin preparing the order). Therefore, the relevant workers in the distribution center may not unnecessarily expend resources to pick a larger quantity of the requested items than required by the modified order. Sometimes, the anomaly can be flagged and addressed once preparation of the order has begun at the distribution center but before the order is shipped to the store. Although the items for the order may be picked, adjustments can be made to the schedule by holding pallets of the picked items instead of loading them onto one or more trailers to be delivered to the store. Relevant users in the distribution center may only pick the requested quantity of 500 items from the held pallets to load the trailer(s) and then return the remaining pallets of items to inventory/storage in the distribution center.

One or more embodiments described herein can include a system for real-time detection and remediation of metric anomalies in a replenishment network, the system including: a data store that can be configured to maintain historic metric data associated with a group of retail environments and distribution centers in a replenishment network, a cache data store that can be configured to temporarily maintain aggregated data for a particular metric of a particular retail environment, a group of data sources, each being configured to generate event data about real-time activities occurring in the replenishment network, and a computer system in data communication with the data store, the cache data, and the group of data sources. The computer system can be configured to perform operations that may include: receiving, from the group of data sources, the event data, retrieving, from the data store, the historic metric data associated with the particular metric of the particular retail environment for a predetermined lookback period of time, aggregating the event data and the historic metric data into aggregated data for the particular metric, storing the aggregated data in the cache data store, determining, based on applying a statistical algorithms model to the cached aggregated data, (i) a predicted value for the metric of the retail environment and (ii) upper and lower tolerance bounds for the metric of the retail environment, iteratively receiving the event data, aggregating the event data and the historic metric data, and determining (i) and (ii) until either (a) determining that a condition is triggered to evaluate the particular metric for the particular retail environment or (b) expiration of a time period to which the predicted value and the upper and lower tolerances apply, and returning, based on a determination that the condition is triggered to evaluate the particular metric, information about one or more anomalies for the particular metric.

In some implementations, the embodiments described herein can optionally include one or more of the following features. For example, the operations may also include performing, based on a determination that the condition is triggered to evaluate the particular metric, an evaluation of the particular metric. Performing the evaluation can include: receiving, in the event data, an actual value for the particular metric, comparing the actual value to the predicted value and the upper and lower tolerance bounds, determining whether the actual value trends outside of at least one of the upper and lower tolerance bounds relative the predicted value, and generating evaluation results based on a determination that the actual value trends outside of at least one of the upper and lower tolerance bounds relative the predicted value. The operations may also include: identifying, based on the evaluation results from performing the evaluation of the particular metric, the one or more anomalies for the particular metric, and returning the information about the one or more anomalies for the particular metric.

Sometimes, the particular metric can include a quantity of items to be ordered to the particular retail environment. The quantity of items to be ordered can be for a current day. The quantity of items to be ordered can be for a next day. The cache data store can be configured to temporarily maintain the aggregated data for 60 days. The event data can be continuously received by the computer system as the event data may be generated by the group of data sources and ingested by a topics listener of the computer system. The predetermined lookback period of time can be a past 60 days.

Returning the information about the one or more anomalies for the particular metric can include transmitting the information to one or more computing devices of relevant users in the replenishment network. The one or more computing devices can be configured to (i) present the information in respective graphical user interface (GUI) displays and (ii) receive respective user input indicating at least one action to be taken in the replenishment network to address the one or more anomalies. The at least one action to be taken in the replenishment network to address the one or more anomalies may include adjusting the quantity of items to be picked and delivered from a distribution center for order replenishment to the particular retail environment.

In some implementations, the group of data sources may include a scheduler computer system that can be configured to (i) generate an order request for items to be delivered to the retail environment based at least in part on historic data indicating orders that were previously delivered to the retail environment and (ii) transmit the order request to the computer system. The group of data source may include a distribution center computer system that can be associated with at least one distribution center in the replenishment network. The distribution center computer system can be configured to: receive the order request from the scheduler computer system, schedule one or more orders for fulfilling the order request to the retail environment, and transmit data corresponding to the scheduled orders to the computer system. The computer system can be configured to perform the operations while the distribution center computer system may be scheduling the one or more orders to fulfill the order request to the retail environment. The system further can include a computing device of a relevant user associated with the at least one distribution center. The computer system can be configured to transit the information about the one or more anomalies to the computing device while the distribution center computer system may be scheduling the one or more orders to fulfill the order request to the retail environment. The computing device can be configured to: present the information in a respective GUI display at the computing device, receive, at the computing device, user input indicating one or more modifications to the orders that are being scheduled by the distribution center computer system, and execute instructions based on the user input to modify the orders that may be scheduled by the distribution center computer system. The distribution center computer system can further: receive the modified orders from the computing device of the relevant user, generate order fulfillment instructions based on the modified orders, the order fulfillment instructions being for execution in the at least one distribution center, and return the order fulfillment instructions for automatic execution by one or more computing systems in the at least one distribution center.

In some implementations, the computer system may include a topics listener that can be configured to listen for and ingest the event data from the plurality of data sources. Sometimes, the operations of the computer system can also include identifying, using an API, one or more exclusions to apply to the event data and the historic metric data, applying the identified exclusions to the event data and the historic metric data to remove outlier data points and generate cleaned data, and aggregating the cleaned data into the aggregated data for the particular metric. As another example, the operations of the computer system can include identifying, using an API, one or more exclusions to apply to the event data and the historic metric data, applying the identified exclusions to the cached aggregated data to remove outlier data points therein and generate cleaned data, and determining, based on applying the statistical algorithms model to the cleaned data, (i) the predicted value for the metric of the retail environment and (ii) the upper and lower tolerance bounds for the metric of the retail environment.

The event data can be received, by the computer system, at different times from the group of data sources, and the computer system can be configured to aggregate the event data and the historic metric data in response to identifying, by a topics listener, a triggering event amongst the received event data, the triggering event indicating the metric of the retail environment. Sometimes, the statistical algorithms model may include a linear regression model. Receiving, from the group of data sources, the event data can include listening for order request data from a scheduler computer system, the scheduler computer system being configured to generate order requests for the group of retail environments in the replenishment network. Sometimes, receiving, from the group of data sources, the event data can include listening for scheduling order data from distribution center computer systems, the distribution center computer systems being configured to generate schedules to fulfill orders requested for the group of retail environments in the replenishment network.

In some implementations, the statistical algorithms model was trained using historic data associated with the replenishment network to generate (i) the predicted value for the particular metric and (ii) a root means square error (RMSE) value. The RMSE value can be used, during runtime by the computer system, to determine a symmetrical distribution of values between the upper and lower tolerance bounds relative the predicted value for the particular metric. The statistical algorithms model may include a machine learning model. The statistical algorithms model may include a regression model. Sometimes, the statistical algorithms model may include a multivariate regression model.

The devices, system, and techniques described herein may provide one or more of the following advantages. For example, the disclosed technology may use cached values of aggregated data over a predetermined period of time (e.g., over the last 60 days), which can save compute resources and time that otherwise would be required to hit data repositories (e.g., data stores, databases, cloud-based storage systems) that store historic and non-aggregated information associated with a particular metric for a particular store. Real-time aggregation and application of a linear regression model on top of the aggregated information can provide benefits by freeing up compute resources so that determinations about potential issues in a supply chain can be identified and remediated as quickly and efficiently as possible before they cause greater issues in the supply chain.

As another example, implementing linear regression modeling can allow a lookback period of 60 days, which can provide a reasonable range of valid values to use for accurately predicting a particular metric for a current or next day. Because the lookback period is only 60 days and the aggregated data for the last 60 days is cached, minimum compute resources, processing power, and time may be used for aggregating and predicting metric values. The available compute resources, processing power, and time can be prioritized for evaluating actual values for the metric against the predictions to identify and address anomalies in the supply chain in real-time.

Similarly, aggregation techniques can be performed on various topics, however predictive techniques described herein may only be applied to some topics, thereby increasing efficiencies in compute resource usage and real-time prediction and remediation of potential issues in the supply chain. Sometimes, data associated with upwards of 250,000 items can be aggregated a day for thousands of retail environments, resulting in over 500 million decisions to be made. The disclosed technology provides lightweight, accurate, and efficient aggregation on a meaningful level, which can then be stored in cache for easy and quick real-time retrieval and use.

The details of one or more implementations are set forth in the accompanying drawings and the description below. Other features and advantages will be apparent from the description and drawings, and from the claims.

BRIEF DESCRIPTION OF THE DRAWINGS

FIGS. 1A and 1B are conceptual diagrams of a system for assessing metrics of a retail environment using aggregation and linear regression techniques and providing timely identification of anomalies regarding those metrics.

FIGS. 4A and 4B are example graphical user interface (GUI) displays that can present information about assessed metrics and anomalies regarding those metrics for a retail environment.

FIGS. 5A and 5B are a flowchart of a process for assessing a metric of a retail environment and providing timely identification of anomalies regarding that metric.

Figure 1C:
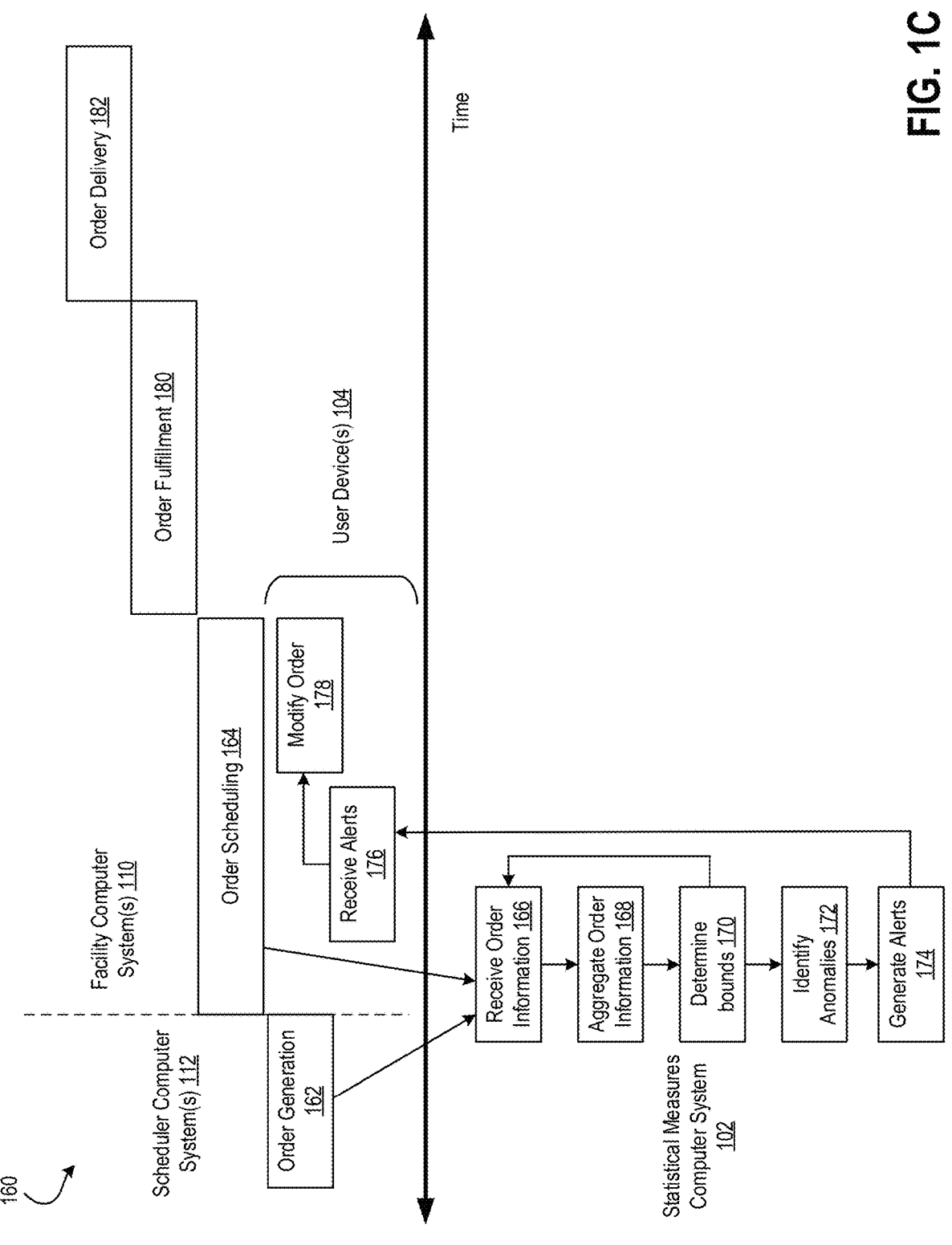
FIG. 1C is a timeline of events for assessing a metric of a retail environment and providing timely identification of anomalies regarding the metric.

In the present disclosure, like-numbered components of various embodiments generally have similar features when those components are of a similar nature and/or serve a similar purpose, unless otherwise noted or otherwise understood by a person skilled in the art.

DETAILED DESCRIPTION OF ILLUSTRATIVE EMBODIMENTS

This disclosure generally relates to systems, methods, platforms, and techniques for real-time aggregation and analysis of data associated with a supply chain for a retail environment (such as a store) to provide timely detection of anomalies and resolution of those anomalies before they cause issues in the supply chain. The disclosed technology can apply linear regression techniques to dynamically generate bounded ranges (e.g., upper and lower bounds) and predicted values for statistical metrics of a retail environment on a recurring basis (e.g., daily) so that anomalous conditions can be accurately and efficiently detected. The disclosed technology can evaluate actual values for the metrics against the predicted values and bounds to determine whether the actual values are operating within the predicted bounds for that particular day. The predictions can be continually updated as information changes and/or event data becomes available.

Replenishing items in retail environments from distribution centers can be a complex process requiring a balance of various predictable and unpredictable factors. The complexity of the process can cause unexpected issues, including but not limited to increasing costs and labor/resources required to fulfill orders for the items. The factors that may cause the replenishment process to be complex include but are not limited to forecasted sales for one or more items at one or more retail environment locations, availability of space that an item requires on a shelf (e.g., to keep the retail environment's appearance looking healthy and/or full with items), frequency that the retail environment location receives deliveries (e.g., a location getting a delivery once a week may need to receive more quantity of items to cover sales compared to a location that receives a delivery a day), and/or a current quantity of item(s) that the retail environment currently has. The factors may additionally or alternatively include whether the replenishment item(s) is flammable and can be stored at the distribution center, whether the replenishment item(s) is being discontinued soon, and/or whether there's too much of the replenishment item(s) at the distribution center. Additionally or alternatively, the factors may include whether the replenishment item(s) is having a promotion, whether the replenishment item(s) is a new item and/or whether a forecast of expected sales requires additional room/flexibility for the new item to be accepted and purchased by end consumers, a length of time that it may take for a delivery vehicle (e.g., trailer) to arrive at the retail environment, and/or user/human involvement in adjusting, creating, and/or maintaining orders for the replenishment item(s). The disclosed technology can address the complexities of the replenishment process by identifying potential anomalies early on so that appropriate action can be taken by relevant stakeholders to reduce costs associated with the replenishment process.

Referring to the figures, FIGS. 1A and 1B are conceptual diagrams of a system 100 for assessing metrics of a retail environment, such as Store A, using aggregation and linear regression techniques, then providing timely identification of anomalies regarding those metrics. The identified anomalies can be addressed using real-time adjustments to prevent issues in the supply chain before they arise. The disclosed techniques can be used to assess a single metric associated with the retail environment against the metric's past history.

Contextual knowledge about the metric may not be required in order to determine a condition for the retail environment on a current day or at some future day. The disclosed techniques may be performed when orders are made by the retail environment for replenishment products, when the orders are submitted to a distribution center for fulfillment and pending, when the orders are being processed at the distribution center, etc. Accordingly, the disclosed techniques may be used to quickly identify anomalies indicating potential issues in the order processing/preparation and address those anomalies before they cause supply chain issues.

As shown in FIGS. 1A and 1B, a statistical measures computer system 102 ('computer system 102') can communicate (e.g., wired, wirelessly) over network(s) 106 with a facility computer system(s) 110, a scheduler computer system(s) 112, a data store 108, and a user device(s) 104. The computer systems 102, 110, and 112 can be any type of computing system, computing device, user device, mobile device, laptop, tablet, computer, cloud-based computing system, etc. The computer system 102 can be configured to perform the disclosed techniques of aggregating and analyzing data associated with a metric for the retail environment to identify anomalies that can be addressed in real-time before they have a negative impact on the supply chain for the retail environment. The scheduler computer system(s) 112 can be a type of management system that can be configured to determine quantities of items to be ordered to retail environments, such as Store A. The scheduler computer system(s) 112 can be configured to schedule orders for one or more of the retail environments. In some implementations, each retail environment or store in a network of stores can have its respective computer system(s) 112. The computer system(s) 112 can be configured to generate and/or maintain order requests and/or other information about available/current inventory in the retail environments, out of stock (OOS) conditions in the retail environment, etc. In some implementations, such as where the scheduler computer system 112 is configured to schedule orders of items to different retail environments based on historic orders that were scheduled and delivered to the retail environments, each retail environment may only be on a receiving end of the ordered items. In other words, the retail environments may not communicate with other system components described herein to schedule such orders.

The facility computer system(s) 110 can be associated with a distribution center that may fulfill the orders that are generated by the computer system(s) 112 of the retail environment and/or other retail environments. Sometimes, the computer system(s) 110 can be a warehouse management system (WMS). The computer system(s) 110 can generate schedules for fulfilling the orders, including generation of tasks/instructions to complete various operations associated with order fulfillment, both on time and efficiently.

The data store 108 can be configured to maintain historic data associated with each metric, each retail environment, each distribution center, each item type, or any combination thereof. As described further in reference to FIG. 2, the data store 108 can comprise multiple data stores, data repositories, cloud-based storage systems, and/or databases, where each of the multiple data stores can maintain different types of information. In some implementations, the data store 108 may maintain only cached values for a previous metric or metrics associated with the retail environment. The cached values can be easily accessed by the computer system 102 for lightweight and efficient performance of the disclosed techniques. In some implementations, the data store 108 can be the same as or similar to as an events data store 202 described further in FIG. 2.

The user device(s) 104 can be any type of mobile device, computing device, laptop, tablet, smartphone, wearable device, computer, etc., used by relevant users of the system 100. The relevant users may view information about the metric per retail environment and the anomalies that are identified by the computer system 102 in graphical user interface (GUI) displays at their respective devices 104. The relevant users may use the presented information to determine and implement intervening actions in the order processing, order preparation, and/or order fulfillment operations between the retail environment and the distribution center to prevent issues from arising in the supply chain and to reduce overall costs and inefficiencies.

Now referring to FIG. 1A, the scheduler computer system 112 can request a quantity of items for a next-day delivery to the store A (or any other retail environment) in block A (114). The request may include any quantity of any type of items that the retail environment desires. The request may be generated by the computer system 112 and based on historic order requests that were generated for the store A or other retail environment. Additionally or alternatively, the request may be generated based on historic trends of items that were needed, ordered, in high demand, in low supply, etc., during previous periods of time (e.g., same or similar periods of time, such as seasons, a past few days, a past week, a past month). The request may include a total quantity of all types of items that the retail environment desires/needs for the next day or another upcoming time period. Therefore, the requested items may not all be a same type of item. The desired items may be identified as having low inventory in the retail environment. As another example, the desired items may be identified as new items that the retail environment will be introducing to customers and putting on their shelves.

The request for items can be transmitted to the facility computer system 110, which can schedule one or more orders for fulfillment of the requested items in block B (116). Scheduling the order(s) for fulfillment can include determining how to consolidate the requested items onto one or more trucks, trailers, or other delivery vehicles. Scheduling the order(s) can include determining numerous tasks and operations to be performed by workers in the distribution center to complete the request on time and efficiently.

The computer system 102 may receive data about distribution center and retail environment activities in block C (118). The data can be received at different times. The data can be continuously received or otherwise ingested by the computer system 102 whenever the data is created and/or modified by the facility computer system(s) 110 and/or the scheduler computer system(s) 112. The data can indicate different activities that are occurring in real-time or near real-time at the distribution center and/or the retail environment. For example, the data received from the scheduler computer system 112 can include the request for the quantity of items from block A (114), current inventory at the retail environment for one or more items, a store plan/item arrangement plan for the current day or the next day, etc. The data receives from the facility computer system 110 can include the schedule(s) made in block B (116), operational tasks that are determined to fulfill the retail environment's order request, schedules and operations of tasks currently being performed or going to be performed at the distribution center to fulfill one or more orders for one or more retail environments, etc.

The computer system 102 can also receive historic data from the data store(s) 108 in block D (120). The historic data can correspond to a predetermined lookback period of time, such as a past 60 days. Sometimes, the data store 108 may cache values/data that corresponds to the lookback period of time. Once the lookback period of time expires, the cached values/data can be removed from storage. Such caching can provide for efficient, lightweight, and compute-resource-saving processing, which further can provide for accurate and timely identification of anomalies in the supply chain. The historic data can include past orders, past schedules, past quantities of requested items, past item types that were requested by the retail environment, past quantities of item sales, etc.

In an illustrative example, the request from the scheduler computer system 112 (block A, 114) can include 500 items. The schedules determined by the facility computer system 110 (block B, 116) can indicate that 5,000 items are to be prepared and delivered to the retail environment. The computer system 102 can receive or retrieve data from the data store 108 indicating quantities of items that have been requested and delivered to the retail environment over the last 60 days (block D, 120).

The computer system 102 can aggregate the data received from blocks C and D (118 and 120 respectively) for a particular metric associated with the retail environment (block E, 122). Since the data may be continuously received or otherwise ingested in block C (118) as it is generated and/or as events are created, the data can be aggregated over the course of a day (or another predetermined time period) for the retail environment. The data can be aggregated or re-aggregated whenever new data is ingested, received, and/or a new event is identified.

As an illustrative example, the computer system 102 can listen for orders or order requests from the scheduler computer system(s) 112. Every time an order is received, the computer system 102 aggregates the corresponding data. Once the aggregation is performed, the computer system 102 can make predictions for the particular metric, as described further below in reference to block F (124). The particular metric may be evaluated every time that new events/data is ingested or when information changes.

The particular metric for the retail environment can be a total quantity of items that the retail environment is going to receive and/or that was ordered to the retail environment (or otherwise requested for the retail environment). The metric may also measure one or more other aspects related to the retail environment and/or the distribution center fulfilling the request for the retail environment, including but not limited to a unit quantity of transfer orders, flow racks, non-flow rack transfer orders, and department transfer orders. The unit quantity of transfer orders can indicate a quantity of a particular item being sent to or otherwise ordered for a retail environment (e.g., store). The flow racks, non-flow rack transfer orders, and department transfer orders can indicate quantities of items that are aggregated to different levels, such as particular types of transfer orders and/or departments to which items are associated. For example, flow rack transfer orders are a type of transfer order in which items flow directly through a facility (e.g., warehouse) to the retail environment, instead of being put in a storage location in the facility and stored until a later time to be sent to the retail environment. Non-flow rack transfer orders are a type of order in which items are put into storage until a later time to be sent to the retail environment. Department transfer orders is a type of order for items associated with a particular department. The department transfer orders provides a view into aggregating quantities of items that are associated with a particular department and being ordered to the retail environment.

As described herein, the particular metric for the retail environment can be generated at predetermined times (e.g., once a day) and can be updated over the course of a predetermined time period, such as over the course of the day as new information/events is generated and ingested (such as when new transfer orders are received for the retail environment). The metric can be the total quantity of items ordered to (requested by) the retail environment. From and To nodes corresponding to a data object for the metric as well as a metric identifier (e.g., key, name) can be used by the computer system 102 to receive the corresponding historic data for the metric of the retail environment from the data store(s) 108 (block D, 120).

In block F (124), the computer system 102 can determine (i) upper and lower bounds and (ii) a predicted value for the particular metric of the retail environment. As described further in reference to at least FIGS. 5A and 5B, the computer system 102 can make these determinations using linear regression models, algorithms, and techniques. The determinations in block F (124) can be performed whenever the data is aggregated in block E (122), which in turn can be performed whenever new events/data is received/ingested in block C (118). As an illustrative example, the predicted value for the particular metric can correspond to an average quantity of items received at/ordered to the retail environment.

The metric can be predicted with linear regression techniques applied in real-time to the aggregated data. For example, the aggregated data for the particular metric can be provided as input to a linear regression model. The linear regression model can be a machine learning model. The model can output both a predicted value for the metric for the current day, the next day, or another future time period. The model can also output a root mean square error (RMSE), which can provide both the upper and lower bounds.

In block G (126), the computer system 102 can compare an actual value for the metric (which can be received as part of the data in block C, 118, at some point during the current day) to the predicted value and the bounds to identify anomalies. In an illustrative example, in block G (126), the computer system 102 can determine whether the actual quantity of items being prepared for the retail environment's request exceeds the predicted value for the metric and/or one of the upper and lower bounds. If so, the computer system can identify an anomaly. The computer system 102 can perform block G (126) once it determines a sufficient amount of data has been received in block C (118). For example, early on in the day, received data may indicate that the actual metric fluctuates quite a bit. The actual metric may fluctuate less over the course of the day as more data is collected and/or new events are ingested. The computer system 102 can apply one or more criteria, as described further in reference to FIGS. 5A and 5B, to determine whether sufficient data has been collected to then perform a comparison of the actual value for the metric against the predicted value and the bounds.

The computer system 102 can generate a notification for anomalous activity that may require one or more modifications in block H (128). The notification can be generated based on the determination in block G (126). If the actual value for the metric is out of bounds, an alert/notification can be generated and transmitted to a relevant users device (refer to FIG. 1B) for further assessment and remediation before the anomaly causes issues in the supply chain.

The notification and/or anomalous activity detection information can be transmitted to an evaluation results data store 224 for storage and later use by the statistical measures computer system 102 or other computing systems described herein (block I, 130). Refer to FIG. 2 for further discussion on the data store 224. Optionally, the notification and/or anomalous activity detection information can be transmitted (e.g., sometimes in real-time) to the facility computer system 110 (block I, 130). As described in reference to FIG. 1B, the notification and/or other detection information can be transmitted to one or more user devices 104.

In some implementations, the facility computer system 110 can adjust the quantity of the requested items before order preparation and shipment in block J (132). Adjusting the quantity can include modifying the schedules/scheduled order(s) that were determined in block B (116). The order for the requested items may be prepared in the distribution center by relevant workers and/or automated machines/ vehicles. Once the order(s) is prepared, the adjusted quantity of the requested items can be delivered to the retail environment in block K (134). Because the anomaly was caught and identified early on by the computer system 102, the mistaken order was able to be modified before activities began to prepare the mistaken order in the distribution center, thereby creating savings in labor, costs, and other resources at the distribution center, as well as providing overall supply chain efficiencies.

As mentioned in the above illustrative example, the order request from the retail environment can include 500 items but the schedules determined at the distribution center can include 5,000 items for fulfilling that order. In block G (126), the computer system 102 can determine that the 5,000 items exceeds the predicted value for the retail environment and exceeds the upper bound indicating an average quantity of items received at the retail environment. The computer system 102 identifies this as an anomaly and generated a notification indicating the anomaly in block H (128). This anomaly can indicate that a relevant user in the distribution center accidentally modified and/or created the order(s) to fulfill the request with 5,000 items instead of 500 items. The 5,000 items simply may not fit with expected and historic averages for the retail environment. Thus, the 5,000 items is the anomaly, which, when identified early on using the disclosed techniques, can be corrected/modified in real-time and before the 5,000 items are prepared in the distribution center, before the 5,000 items are loaded onto a delivery vehicle for the retail environment, before the 5,000 items leave the distribution center, and/or before the 5,000 items arrive at the retail environment.

FIG. 1B illustrates additional details about the techniques that are performed and described in reference to FIG. 1A. Referring to the system 100 in FIG. 1B, the computer system 102 receives event data at varying times from the facility computer system 110, the scheduler computer system 112, and the data store 108 (block A, 140). The event data can include transfer orders and/or purchase orders. The computer system 102 can listen for such event data and can consume it whenever it is detected.

The computer system 102 further aggregates the received data in block B (142) as the data is received/ingested. The computer system 102 can maintain the received data in a sharded database architecture, in some implementations, for easy and efficient retrieval and use during performance of the disclosed techniques. Aggregating the data can include making aggregations for a particular day from one particular node, such as the particular retail environment and/or the particular distribution center. Sometimes, the computer system 102 can aggregate data corresponding to all different orders associated with the retail environment to generate an aggregated requested quantity of all items for the retail environment. Although data can be aggregated for all items for the retail environment, in some implementations, the data can be aggregated for individual/particular item types for the retail environment.

Optionally, the computer system 102 may receive user input for a particular metric for the retail environment (e.g., Store A) in block C (144), from the user device(s) 104. The user input can be an event that causes triggering of the operations described herein (the operations being aggregation and analysis of data associated with the particular metric for the retail environment). The particular metric, as described herein, can be a quantity of items that are ordered to the retail environment. Sometimes, block C (144) can be performed part of block A (140). Sometimes, block C (144) can be performed before, during, or after one or more other blocks, such as blocks A and B (140 and 142, respectively). In some implementations, block C (144) may not be performed, because the computer system 102 may simply and continuously listen for and ingest new event data associated with the retail environment, which then can trigger performance of the disclosed techniques to measure and assess the metric for that retail environment. As described herein, every retail environment has a respective metric. The metric can indicate a total quantity of items being delivered to that retail environment.

In block D (146), the computer system 102 can apply linear regression techniques (e.g., machine learning) to the aggregated data. The computer system 102 can run the aggregations through a linear regression model. Advantageously, the linear regression model allows can allow a lookback period of 60 days, which can provide a reasonable range of values to use to accurately predict a value for the metric for the current day or the next day.

By applying the linear regression techniques, the computer system 102 can determine a predicted value and bounded ranges for the particular metric for the retail environment (block E, 148). Sometimes, at least block E (148) can be performed during the night and the predictions can be made for a next/upcoming day. Sometimes, at least block E (148) can be performed during a current day, and the predictions can be made for the current day (and/or the next/upcoming day).

The computer system 102 can continue aggregation and predictions until one or more evaluation criteria is met in block F (150). As described further in reference to FIGS. 5A and 5B, the computer system 102 can continue to aggregate the ingested data and determine the predicted value for the metric for the current day or the next day, as well as the bounds, until the computer system 102 determines that sufficient data has been collected to make a stable and accurate determination about whether an actual value for the metric is trending as expected. Using the disclosed techniques, the computer system 102 can dynamically determine the predicted value and bounded ranges for the metric without requiring manual estimations or static bounded ranges that may not accommodate for changes that occur over time.

Once the evaluation criteria is met, the computer system 102 can evaluate an actual value for the particular metric (which can be received as part of the event data in block A, 140) during a predetermined period of time using the predicted value and bounded ranges (block G, 152). The predetermined period of time can be a current day. The predicted period of time can be a next day. The described aggregation, predictions, and evaluations can allow for dynamic and real-time adjustment of thresholds and trends of the metric for the retail environment based on ever-changing business needs.

If the actual value is trending outside of one or more of the bounded ranges (e.g., by any amount, by at least a threshold amount), the computer system 102 can identify one or more anomalies for the particular metric (block H, 154). If the computer system 102 determines that the actual value is trending within the bounded range(s), the computer system 102 can still continue aggregating the data in block B (142) and checking whether the actual value ever begins to deviate from within the bounded range(s). The evaluation in blocks G and H (152 and 154 respectively) can be performed as soon as the computer system 102 receives or ingests event data being sent to a topics listener (e.g., KAFKA topics listener) indicating a metric to be processed/evaluated for a retail environment.

Figure 4B:
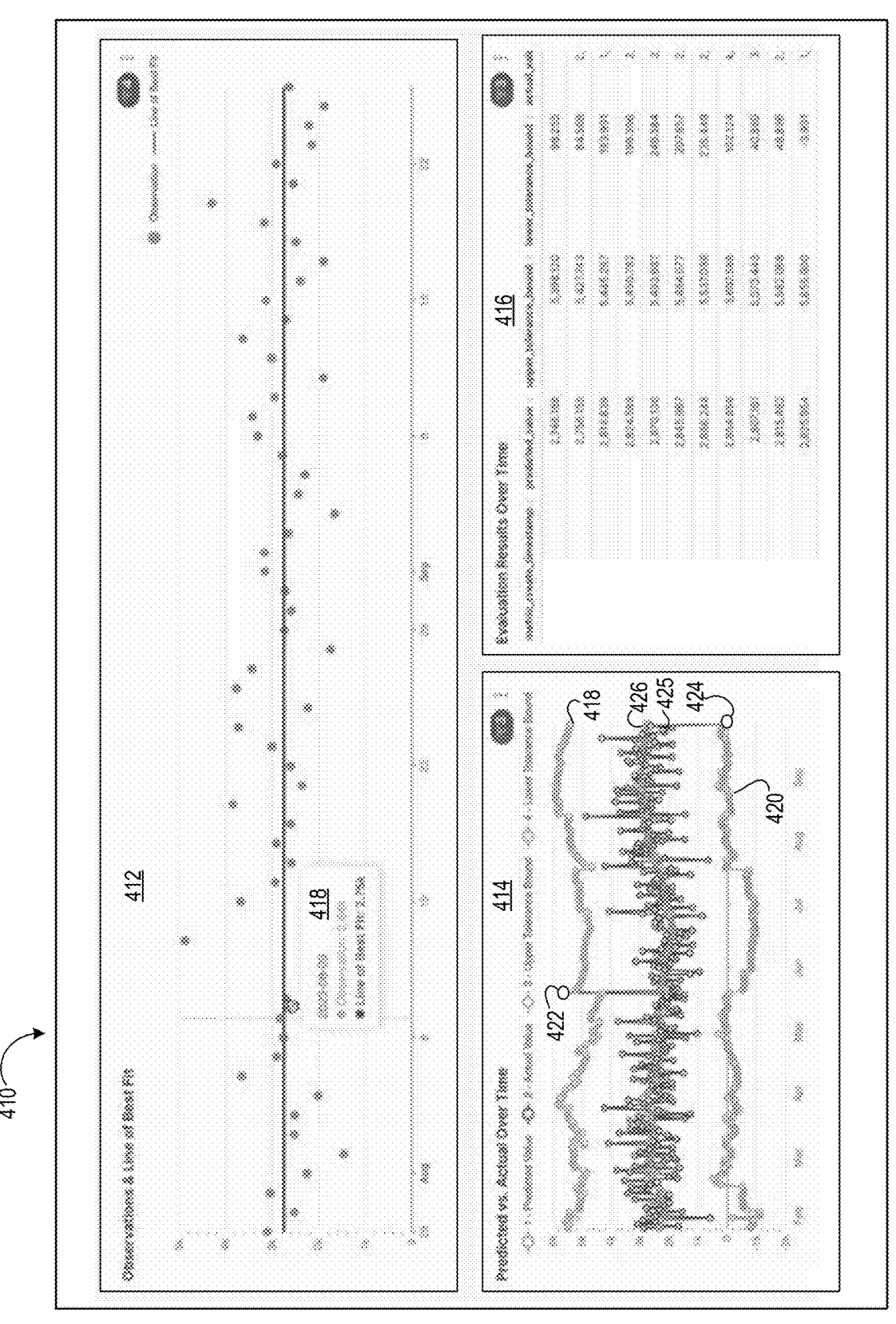

The computer system 102 can generate alerts and/or notifications indicating the identified anomalies in block I (156). The alerts and/or notifications can include output 155, which can be presented in GUI displays of relevant user device(s) 104. The generated output can provide visibility about the supply chain so that remediation actions can be quickly and easily determined and executed to avoid issues in the supply chain. The output 155 can be presented at the user device 104 as an alert indicating a specific metric that was identified and triggered as an anomaly. Refer to FIGS. 4A and 4B for further discussion about different types of output, such as output indicating what metrics were fired, analyzed, and how those metrics trended according to pre-determined respective bounds.

The computer system 102 transmits the alerts and/or notifications to the user device(s) 104 in block J (158). The user device(s) 104 can present the output 155 (and/or the alerts/notifications more generally) in the respective GUI display. The user device(s) 104 can generate and/or execute event (e.g., activity) modifications based on the received and presented information (e.g., the output 155, the alerts, the notifications) (block K, 159). Those event modifications can then be transmitted to the facility computer system(s) 110 and/or the scheduler computer system(s) 112 for realization and execution.

Presenting the alerts/notifications at the user device(s) 104 can include providing access to various other information that may be stored about the retail environment and/or the distribution center (such as in the data store(s) 108). Accordingly, the user at the user device(s) 104 can view, in response to receiving an alert that the metric is trending out of expected bounds, all transfer orders and a business context for those orders to determine whether the anomaly indicated by the alert is related to a particular department, the retail environment being a new store, and/or a particular type of issue arising/a forecasted issue. Therefore, the user can assess a variety of information to determine how to respond to the alert to remedy the anomaly before the anomaly causes supply chain issues. Sometimes, the user can compare the anomaly indicated in the alert to known events for the retail environment to determine whether the anomaly is in fact an issue to be addressed for the retail environment. In some implementations, a computer system, such as the computer system 102 can automatically compare the anomaly indicated in the alert to known events for the retail environment to identify whether the anomaly is in fact an event (e.g., issued) to be addressed.

In some implementations, transmitting the alerts/notifications in block J (158) can include providing the user device(s) 104 with a list of potential issues and/or activities in the retail environment and/or the distribution center that should be checked (and potentially modified). Sometimes, the alerts/notifications can include additional information, such as item identifiers for the items that are requested or otherwise part of the order for the retail environment. The alerts/notifications can include additional information such as a type of order and/or a type of transaction. The alerts/notifications can include additional information such as case packs that contain the requested items for the retail environment. This information can be analyzed by the user a the user device(s) 104 to determine whether an entire case pack is to be delivered to the retail environment, whether the case pack is to be split up into multiple cases. The user can further determine whether the identified anomalies relate to the entire case packs or the notion that the case packs would be broken down into multiple cases. In yet some implementations, the user can provide inputs at the user device(s) 104 to override a forecast or identified anomalies, thereby indicating that the metric for the retail environment is not anomalous and the current conditions are as expected/not out of the ordinary.

Figure 2:
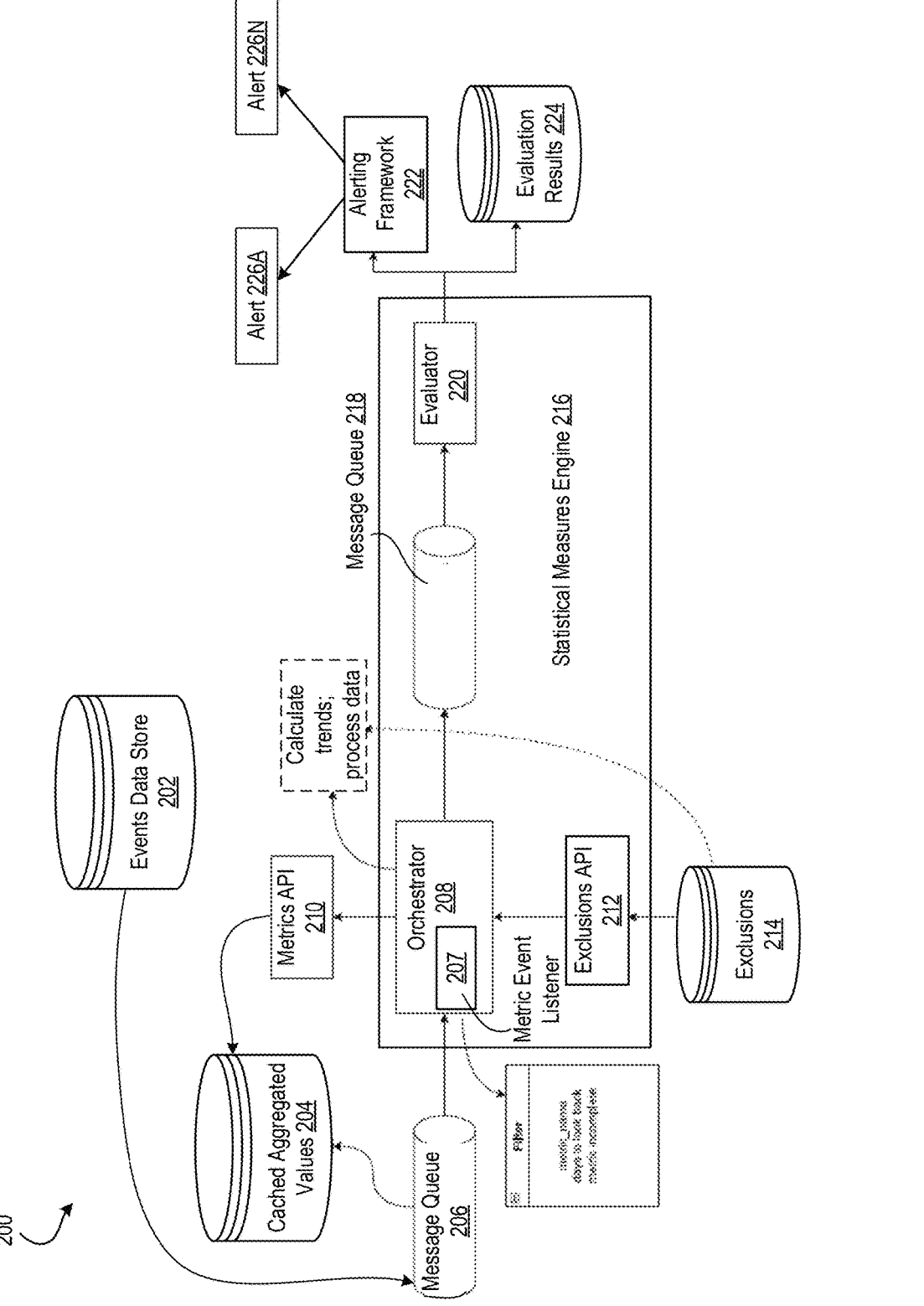
FIG. 2 is a system diagram of one or more components that can be used to perform the disclosed techniques.

FIG. 1C is a timeline 160 of events for assessing a metric of a retail environment and providing timely identification of anomalies regarding that metric. As described herein, the disclosed techniques can be performed to identify anomalies and remediate those anomalies before they lead to issues and/or inefficiencies in the supply chain. For example, the disclosed techniques of predicting values and bounds for the metric and evaluating an actual value for the metric against those predictions can be performed before an order for the retail environment is prepared, fulfilled, and/or delivered to the retail environment.

As shown by the timeline 160, first an order can be generated (block 162). The order can be generated by the scheduler computer system(s) 112, the request indicating a quantity of items to be delivered to the retail environment during an upcoming period of time.

The facility computer system(s) 110 may receive the generated order from the scheduler computer system 112 and begin scheduling the order (block 164). Once the order is generated (block 162) and while the scheduling is being performed (block 164), associated data/information can be transmitted to the statistical measures computer system 102, which can perform numerous operations before the order is fulfilled at the retail environment (block 180).

For example, the computer system 102 can receive order information in block 166. The information can be received while and/or after the order is generated in block 162. The information can be received before and/or while the order is being scheduled in block 164.

The computer system 102 aggregates the order information as it is received (block 168). The computer system 102 can also determine bounds (e.g., predicted value for the metric of the retail environment, upper bounds, lower bounds) for the metric of the retail environment in block 170, based on applying linear regression techniques (e.g., machine learning techniques) to the aggregated order information.

The computer system 102 can iteratively perform blocks 166-170 until the computer system 102 determines that sufficient information has been collected to evaluate current conditions associated with the metric. Once sufficient information is collected, the computer system 102 can identify anomalies (block 172) by comparing an actual value for the metric (which can be received in the order information in block 166) to the determined bounds. The computer system 102 generates alerts about the anomalies (block 174) and provides those alerts to the user device(s) 104.

The user device(s) 104 may receive the alerts (block 176) and modify the order in block 178 based on assessment of the anomalies indicated in the alert. The modifications to the order (which can include modifying the order that was generated by the facility computer system 110 in block 162 and/or modifying schedules, operations, and tasks deter- mined by the computer system 110 in block 164) can be made while the order is still being scheduled in block 164 by the facility computer system 110.

Accordingly, anomalies/issues with the order can be iden- tified and remediated before the order scheduling is com- pleted (block 164) and before order fulfillment (block 180). Once the order has been modified (block 178) and the scheduling has been completed (block 164), the facility computer system 110 can begin order fulfillment (block 180). Once the fulfillment is completed (block 180), the delivery or the order can be performed (block 182).

In some illustrative examples, the blocks 166-174 can be performed during order fulfillment (block 180) and/or dur- ing order delivery (block 182). If an anomaly is detected during order delivery (block 182), for example, then an alert can be transmitted to computer systems at a retail environ- ment receiving the order so that the retail environment can be notified of an error in the order. The retail environment may still desire to unload all the items from a truck deliv- ering the order of items and then perform a process to put the erroneous items back onto a trailer or truck that is to be sent back to the facility or another facility.

Although the blocks 162-182 are illustratively described from the perspective of various computing systems described in reference to at least FIGS. 1A and 1B, the blocks 162-182 may also be performed by other computing systems and/or devices.

FIG. 2 is a system diagram 200 of one or more compo- nents that can be used to perform the disclosed techniques. A statistical measures engine 216 (e.g., the statistical mea- sures computer system 102 of at least FIGS. 1A and 1B) can be in network communication with one or more compo- nents, including but not limited to data stores 202, 204, 214, and 224, a message queue 206, a metrics API 210, and an alerting framework 222. The statistical measures engine 216 can include one or more subcomponents, services, and/or systems, including but not limited to an orchestrator 208, an exclusions API 212, a message queue 218, and an evaluator 220.

As described in reference to FIGS. 1A, 1B, and 1C, events, such as transfer orders, can be generated (e.g., by retail computer systems, by facility computer systems). The message queue 206 can ingest messages indicating events stored in an events data store 202. The data store 202 can maintain every event that is detected in/by the system 200. The events can further be stored in the data store 202 with all relevant fields, inputs, information, etc., all of which may not be necessary for performing the disclosed techniques. Identification of event data can trigger performance of the disclosed techniques. For example, event data can be injected into, received, or otherwise listened by a message queue 206. The message queue 206 can consume data that is injected into a data stream. The message queue 206 can provide the event data to the cached aggregated values data store 204, in some implementations. A metric event listener 207, which can be part of an orchestrator 208, can be configured to listen for particular types of event data that is ingested by the message queue 206. If the metric event listener 207 identifies a triggering event, then the other operations described herein can be performed by other components of the system 200 to identify potential anoma- lies regarding a metric associated with the triggering event data.

Events data from the data store 202 can be aggregated (such as by the computer system 102 as described in reference to FIGS. 1A, 1B, and 1C) and stored in the cached aggregated values data store 204. The computer system 102 described herein can, for example, pre-process the data/ information in the events data and identify only the relevant information in the events data to be stored in cache (e.g., at the cached aggregated values data store 204). The data store 204 can maintain the cached aggregated values for a pre- determined period of time, such as a past 60 days. The cached aggregated values may be stripped down information derived from all the events data associated with the retail environment that is continuously ingested into the events data store 202. For example, the cached aggregated values can include a particular metric, a value for that metric, and a timestamp/time period associated with the value for the metric (e.g., a current day). Only the cached aggregated values for the predetermined period of time may be relevant for the disclosed techniques.

To populate the cached aggregated values data store 204, metric values for the day or another predetermined period of time can be aggregated then moved to the data store 204 for caching storage. The aggregation can be performed on a variety of topics ingested by the system 200. However, not all of the ingested topics are provided to an orchestrator 208 to perform the disclosed techniques. A variety of jobs may be performed at the system 200 to query the events data store 202 and move aggregated values into the cached aggregated values data store 204.

As described above, the metric event listener 207 of the orchestrator 208 can listen for events relating to a metric associated with a retail environment, and hit the cached aggregated values data store 204 to retrieve relevant historic data for that metric over the predetermined period of time. Fewer compute resources and processing power may be used to retrieve cached data in the data store 204, rather than accessing/polling the data store 202 that stores all events data. The cached aggregated values can be stored in the data store 204 in association with the particular metric, thereby making access and retrieval of necessary historic data effi- cient. As a result, the disclosed techniques are lightweight and can be performed efficiently to subsequently detect anomalies associated with the metric in real-time.

The orchestrator 208 of the system 200 may ingest the cached aggregated values from the data store 204 via the listener 207 and apply linear regression techniques or other statistical algorithms to the ingested values to determine a predicted value for the metric and upper and lower bounds. The orchestrator 208 may access a metrics API 210 to receive relevant information about the metric being assessed (the relevant information being retrieved/polled from the cached aggregated values data store 204). The orchestrator 208 may additionally or alternatively access an exclusions API 212 to identify and receive one or more exclusions from an exclusions data store 214. Those exclusions may be applied to the ingested values to exclude values that may be attributed to known anomalies (e.g., seasonality of items, holiday-related items), as described further in reference to FIGS. 5A and 5B.

The orchestrator 208 can sometimes determine one or more filters that can be used to determine what values to ingest. The filters may include a metric name or other identifier, whether the metric data satisfies one or more sufficiency criteria, and/or a number of days for lookback (e.g., a 60 day lookback period, another lookback period). For example, the one or more sufficiency criteria can be applied to determine whether a sufficient amount of historic data is known/available about the metric. If a sufficient amount of historic data is available, then it is less likely or unlikely that outliers for the upper and lower tolerance bounds may be identified.

As additional or other examples, the orchestrator 208 can be configured to iterate through the aggregated data for a particular metric to determine values for the metric, such as the actual value for the metric. The orchestrator 208 may also determine the upper and lower bounds for the metric. Any of these values can be determined based on applying linear regression techniques or other statistical algorithms to the aggregated data. The determined values can then be consumed by a message queue 218 and passed to an evaluator 220. The evaluator 220 can determine whether the actual value for the metric is within tolerance of the bounds and whether to trigger one or more alerts regarding the trending of the metric. In some implementations, the orchestrator 208 may also train, iteratively train, and/or improve one or more linear regression models or other statistical algorithms that are used by the orchestrator 208 as described herein.

The predicted value and the determined bounds can be linearly sent/transmitted by the orchestrator 208 to the evaluator 220. For example, the message queue 218 can listen for the predicted value and bounds from the orchestrator 208, then feed the predicted value and the bounds to the evaluator 220. In some implementations, the orchestrator 208 may publish the predicted value and the determined bounds, which can then be listened for and retrieved by the message queue 218, then fed to the evaluator 220.

The evaluator 220 may receive, via the message queue 218, the actual value for the metric. The evaluator 220 can compare the actual value for the metric against the predicted value and the determined bounds from the orchestrator 208. The evaluator 220 can determine whether the actual value trends within the bounds or exceeds the bounds. If the actual value exceeds the bounds (by any amount or by a predetermined threshold amount), the evaluator 220 can identify anomalies and send information, alerts, and/or notifications about the notifications to an alerting framework 222 and/or an evaluation results data store 224. Information about the evaluation, the anomalies, alerts, notifications, etc. can be transmitted for storage to and later retrieval from the evaluation results data store 224.

The alerting framework 222 can be an alert shuttling system, configured to generate one or more different types of alerts 226A-N, notifications, and/or outputs based on the information provided from the evaluator 220. The alerts 226A-N can include any of the alerts, notifications, and outputs described throughout this disclosure.

Figure 3:
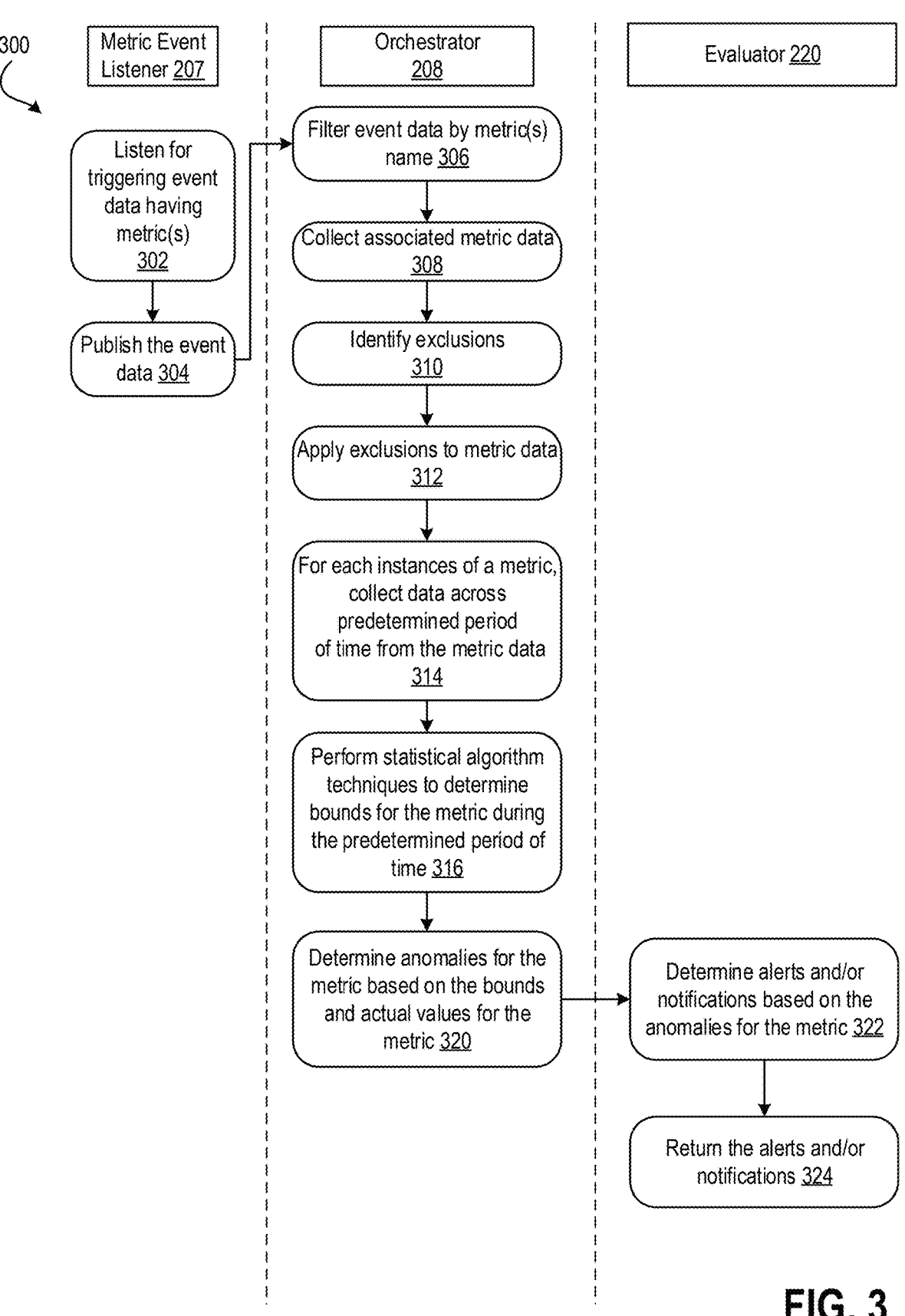
FIG. 3 is a swimlane diagram of a process for assessing a metric of a retail environment and providing timely identification of anomalies regarding that metric.

One or more components of the system 200 can be part of the statistical measures computer system 102 described throughout, such as in reference to FIGS. 1A, 1B, and 1C. In some implementations, one or more components of the system 200 can be part of the data store(s) 108 described throughout, such as in reference to FIGS. 1A, 1B, and 1C. For example, the events data store 202, the cached aggregated values 204, the exclusions 214, and/or the evaluation results 224 can be part of the data store(s) 108. Refer to FIG. 3 for further discussion about the techniques/operations performed by components of the system 200.

FIG. 3 is a swimlane diagram of a process 300 for assessing a metric of a retail environment and providing timely identification of anomalies regarding that metric. The process 300 can be performed by multiple components described in reference to the system 200 of FIG. 2, such as the metric event listener 207, the orchestrator 208, and the evaluator 220, one or more which may be part of the statistical measures engine 216. The process 300 can also be performed by one or more other system components described throughout this disclosure.

Referring to the process 300 in FIG. 3, the metric event listener 207 can listen for triggering event data (e.g., one or more messages) having one or more metrics for a retail environment (block 302). In some implementations, the metric event listener 207 can be a KAFKA listener that looks for topics and ingests topics associated with the metric(s). The metric event listener 207 can publish the event data in block 304.

The orchestrator 208 can filter the published event data by the metric(s) name in block 306. For example, the orchestrator 208 may identify only the event data that is associated with the particular metric of interest for the retail environment.

In block 308, the orchestrator 208 can collect associated metric data based on the filtered messages. The orchestrator 208 can transmit the filtered event data to an API, which can be used to retrieve historic data associated with the particular metric. The collected metric data can include cached aggregated historic values, as described in reference to FIG. 2. Before collecting the metric data, a broader aggregation of all transfer orders and other event data can be performed so that the orchestrator 208 collects larger chunks of data, which are the cached aggregated values, rather than all the individual transfer orders and other event data that is ingested by the system components described herein. The API can therefore be used to query a caching layer of data storage to make the collection of the metric data more efficient.

The orchestrator 208 can identify exclusions for the metric in block 310. The orchestrator 208 can identify exclusions by accessing the exclusions API 212 described in FIG. 2. The exclusions API 212 can be used to identify outliers in the data for the metric.

Accordingly, the orchestrator 208 can apply the exclusions to the metric data in block 312. In other words, the orchestrator 208 can exclude the outliers from use in linear regression techniques described herein. The exclusions can be performed on a daily basis, or on one or more other predetermined periods of time.

In block 314, for each instance of a metric, the orchestrator 208 can collect data across a predetermined period of time from the metric data. Each instance of the metric can have a corresponding unique identifier, which can be used for identifying and collecting the data. The predetermined period of time from the metric data can be a 60 day lookback period.

The orchestrator 208 can perform statistical algorithm techniques on the collected metric data (e.g., once the outliers are excluded) to determine bounds for the metric during the predetermined period of time (block 316). The statistical algorithm techniques can include linear regression techniques described throughout this document. In some implementations, the techniques may include different types of regression techniques, such as multivariate regression analysis and modeling. In yet some implementations, the techniques can include standard deviation modeling and algorithmic techniques. As an illustrative example, a 60-day history for the metric of the retail environment can be provided as input to a linear regression model. Output from running the model can include a predicted value for the metric and an RMSE value, which can be used to determine the upper and lower bounds for the metric.

The orchestrator 208 can determine anomalies for the metric based on the bounds and actual values for the metric (block 320). In some implementations the anomalies can be determined by the statistical measures engine 216, as described in reference to FIG. 2.

The anomalies can be transmitted to the statistical measures engine 216 and used to determine alerts and/or notifications, such as whether to generate an alert/notification (block 322).

The statistical measures engine 216 can return the alerts and/or notifications (block 324). The alerts, notifications, predicted value, bounds, and anomalies can be sent to/received by a KAFKA topic that listens for such information and stores the information in a database (e.g., the evaluation results data store 224 of FIG. 2). The associated historic metric data may also be stored in the database along with the returned alerts and/or notifications to provide context for the alerts and/or notifications. In block 324, the statistical measures engine 216 can, if the metric is out of tolerance, query an alerting framework (such as the alerting framework 222), which can apply rules to determine how and when too send out notifications throughout a network of relevant users.

In some implementations, the orchestrator 208 can perform the blocks 306-314 and 318-320, or blocks 306-314 whenever messages indicating transfer orders are identified in block 302.

FIGS. 4A and 4B are example graphical user interface (GUI) displays 400 and 410, respectively, that can present information about assessed metrics and anomalies regarding those metrics for a retail environment. The GUI 400 of FIG. 4A provides an overview of metrics that are evaluated over the course of a period of time, such as a current day.

In particular, the GUI 400 includes a graphical element 402, which indicates how many metrics are evaluated over the period of time. In this example, approximately 1,570 metrics have been evaluated for the current day, which shows an approximate 61.3% decrease compared to the prior day. Each metric corresponds to a different retail environment (e.g., "to_node") in a network of retail environments. As the current day continues, additional metrics can be evaluated for other retail environments, which can cause the graphical element 402 to be automatically updated in the GUI 400. The graphical element 402 further can include an illustration, such as a sloping and/or curved line, indicating the difference in quantity of metrics evaluated on the current day compared to the prior day. In some implementations, the quantity of metrics evaluated on the current day can be compared to one or more other past periods of time, such as a past 3 days, a past 5 days, a past week, etc.

The GUI 400 includes a graphical element 404, which indicates a quantity of metrics that are currently out of tolerance. In this illustrative example, 4 metrics are out of tolerance. The 4 metrics can be out of tolerance over any predetermined period of time, not just the current day. For example, the 4 metrics may be out of tolerance for a last 5 days. Being out of tolerance means that the metric is outside of the predicted upper or lower bounds for that metric, which indicates that action may be required to prevent supply chain issues for at least the retail environment associated with the metric (e.g., the "to_node"). The graphical element 404 indicates that the current quantity of metrics out of tolerance is an approximate 71.4% decrease compared to the past period of time, which was the prior day. This can indicate that between the prior day and the current day, one or more metrics that were trending out of tolerance during the prior day have been remediated/modified. The graphical element 404, like the graphical element 402, can also include an illustration, such as a sloping and/or curved line indicating when throughout the day and how many metrics are identified as being out of tolerance.

The GUI 400 further may include a table 406, which shows information about out of tolerance metrics over a predetermined period of time. The illustrative table 406 shows the information for the last 5 days. The table 406 may additionally or alternatively show the information over the last day, the last 2 days, the last 3 days, the last 7 days, the last 2 weeks, the last month, etc. The information in the table 406 can include, but is not limited to, a timestamp indicating when each metric was created, a metric name or other unique identifier, a from_node indicator, a to_node indicator, a predicted_value for the metric, an upper_tolerance_bound for the metric, a lower_tolerance_bound for the metric, an actual_value for the metric, and a delte_rmse value for the metric. The entries in the table 406 can be sorted by any of the information presented in the table 406. In the illustrative example of FIG. 4A, metrics can be shown as out of tolerance (as shown by the graphical element 404) and can be sorted at the top of the table 406.

The metric_name indicates a definition of a type of aggregate or metric being analyzed. The metric_name may also be a dimension for which to slice and analyze information associated with a supply chain event. The from_node is a unique identifier for a node, such as a retail environment or a distribution center, from which items originate for the particular metric. The to_node is a unique identifier for a destination node for the items that originate at the from_node, such as a retail environment or a distribution center. The predicted_value, upper_tolerance_bound, and lower_tolerance_bound are values determined for the particular metric and by a computer system using linear regression techniques, as described herein. The actual_value is a real-time value for the metric that the computer system selects for evaluation against the predicted value and the bounds. The delta_rmse is a value that is generated as output by the orchestrator 208 (refer to FIG. 2), which is evaluated by the evaluator 220 (refer to FIG. 2) to determine whether the actual value is in fact trending out of bounds and/or deviating from the predicted_value. A delta_rmse value that is trending +− a configurable, predetermined value may be considered out of tolerance. In the illustrative example, the configurable predetermined values are −4 and +4. Therefore, any metric in the table 406 having a delta_rmse value that is −4 or +4 can be considered as trending out of tolerance. The predetermined value can be configured to a specific metric and can be determined by a relevant user and/or automatically by a computer system described herein.

The GUI 410 presents information about a particular metric for a particular store that has been evaluated (evaluated on a current day and/or over a predetermined period of time). The GUI 410 includes graphs 412 and 414 and a table 416. The graph 412 indicates observations of the metric performance and a line of best fit. The observations are represented by floating points in the graph and the line in the graph 412 represents the line of best fit. The graph 412 can present the observations for a 60-day lookback period, which can be the same time period used by the linear regression techniques described herein to evaluate the metric on a current day. One or more other lookback periods can be used and presented in the GUI 410. As a user hovers over points and/or the line in the graph 412, a pop-out window 418 can be presented to overlay a portion of the graph 412 and provide additional information about where the user's cursor is hovering on the graph 412. For example, the pop-out window 418 can indicate, on a particular day, how many observations were made and a line of best fit.

The graph 414 indicates predicted values versus actual values over time for the particular metric. The graph 414 can present such information over any period of time that is set by a relevant user. In the example of FIG. 4B, the graph 414 presents the information over a past 7 months. The graph 414 can present the information over a longer or shorter period of time. The graph 414 includes a line of points 418 indicating an upper tolerance bound for the metric, as determined using the disclosed techniques, over the last 7 months. The graph 414 also includes a line of points 420 indicating a lower tolerance bound for the metric over the last 7 months. The upper and lower tolerance bounds can shift and change over time, based on metric data that is ingested and evaluated on a daily/continuous basis using the linear regression techniques described herein. The graph 414 includes a line of points 426, which indicates predicted values of the metric that are determined using the disclosed techniques, over the last 7 months. Furthermore, the graph 414 includes a line of points 425 indicating actual values of the metric that are identified and used to evaluate the metric over the last 7 months against the upper and lower tolerance bounds and the predicted values. Although the graph 414 shows the values trending over the last 7 months, each point/value determined and shown in the graph 414 is determined using data over a last 60 days, as described herein.

In the illustrative graph 412 of FIG. 4B, an actual value point 422 was identified to exceed the upper tolerance bound in the line of points 418 between May and June. Another actual value point 424 was identified to exceed the lower tolerance bound in the line of points 420 in or after September. The computer system described herein may identify the points 422 and 424 as anomalies, and thus notify the relevant user(s) to assess the metric and conditions for the particular retail environment and take remediation actions (if needed). As shown in the graph 414, remediation actions were taken after identification of the anomalous point 422 because between June and July, the line of points 425 indicating the actual values of the metric were found to be within the upper and lower bounds and closer to the line of points 426 indicating the predicted values of the metric.

The table 416 can present similar information as the table 406 in the GUI 400 of FIG. 4A. In comparison to the table 406 in the GUI 400, the table 416 in the GUI 410 only presents information for the particular metric for the particular retail environment that is shown and evaluated in the GUI 410.

Figure 5B:
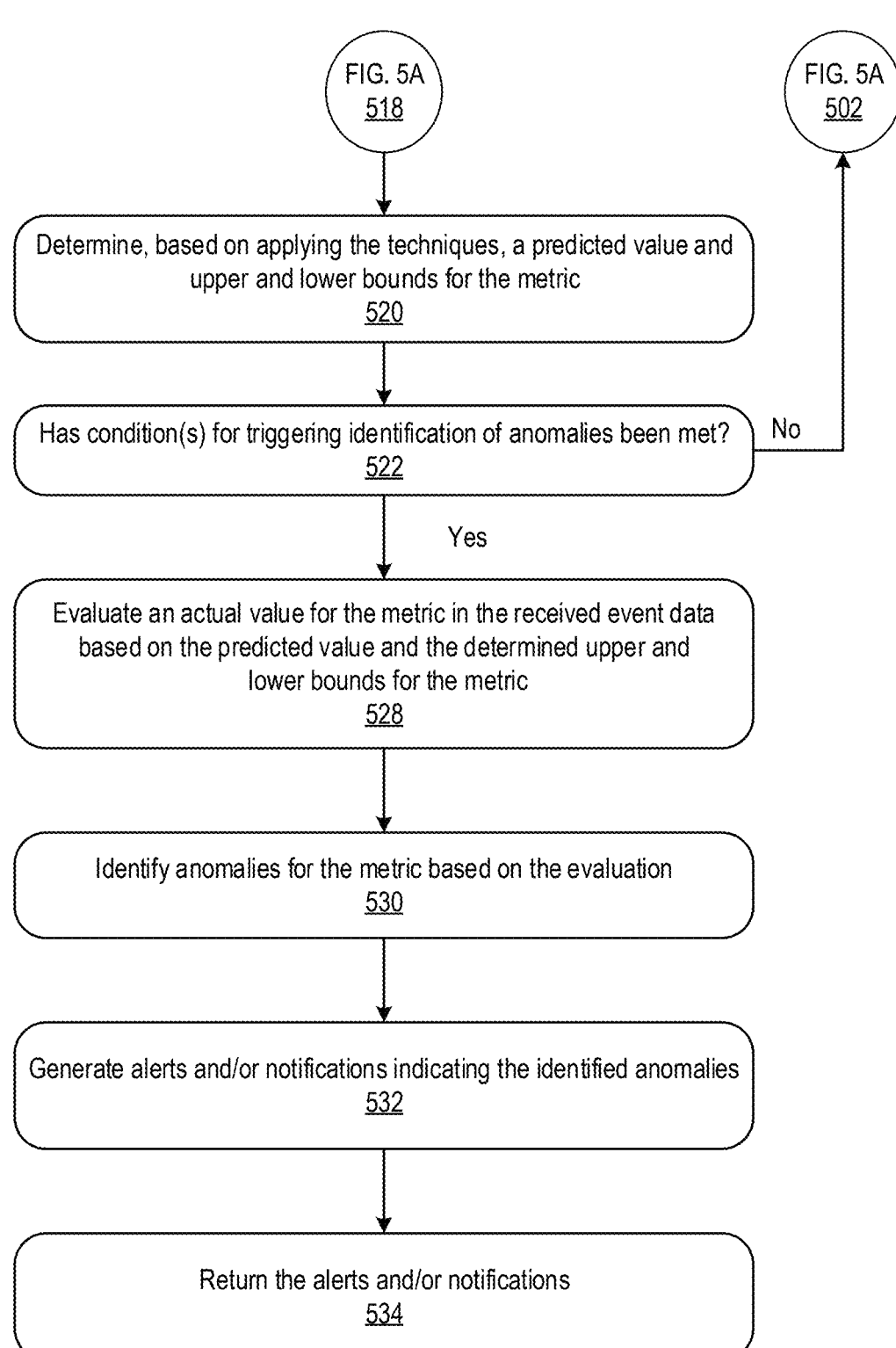

FIGS. 5A and 5B are a flowchart of a process 500 for assessing a metric of a retail environment and providing timely identification of anomalies regarding that metric. The process 500 can be performed by the statistical measures computer system 102. The process 500 can also be performed by one or more other computing systems, devices, computers, networks, cloud-based systems, and/or cloud-based services, including any components of the system 200 in FIG. 2 and the process 300 in FIG. 3. For illustrative purposes, the process 500 is described from the perspective of a computer system.

Referring to the process 500 of FIGS. 5A and 5B, the computer system can receive, at different times, event data from a plurality of sources, the event data being associated with a metric for a retail environment (block 502). As described herein, the computer system can receive the event data whenever it is generated or otherwise ingested. In some implementations, the computer system can receive the data in batches, such as at predetermined time intervals, after a particular type of event data is ingested, etc. The plurality of sources can include computing systems of distribution centers (e.g., the facility computer system 110 in FIGS. 1A, 1B, and 1C, warehouse management systems). The plurality of sources can include computing systems associated with retail environments (e.g., the scheduler computer system 112 in FIGS. 1A and 1B). The plurality of sources can include user device(s) 104 of relevant users in a network of retail environments and distribution centers. The plurality of sources can include one or more of the data stores described throughout this disclosure.

As part of receiving the data in block 502, the computer system can listen for orders data from retail environment systems (block 504). The computer system can additionally or alternatively listen for scheduling data from distribution center systems (block 506). As described in reference to FIG. 2, a KAFKA topics listener (e.g., metric event listener 207) can listen for the orders data and/or the scheduling data from one or more different systems and/or data stores, ingest that data, and provide to the computer system for further processing. As described throughout this disclosure, if the computer system receives a triggering event data in blocks 502-506, the computer system can proceed through the process 500 to process and evaluate the particular metric for the retail environment.

The computer system can retrieve historic data for a lookback time period that is associated with the metric for the retail environment (block 508). The historic data can be related to the particular metric. For example, if the metric is a daily total quantity of items ordered to the retail environment, then the historic data can include daily total quantities of items ordered to the retail environment over the lookback time period. The lookback time period can be defined by linear regression techniques that are performed by the computer system. The lookback time period can be a past 60 days. The lookback time period can be shorter or longer. As illustrative non-limiting examples, the lookback time period can be a past 10 days, 15 days, 20 days, 30 days, 50 days, 80 days, 100 days, 180 days, 365 days, etc.

In some implementations, the historic data can first be aggregated and stored in cache, as cached values. The historic data can remain in cache for 60 days. In block 508, the computer system can then easily and efficiently retrieve the cached 60-day historic data from cache, instead of making calls to one or more data stores to identify and retrieve the 60-day historic data from storage.

The computer system can aggregate the data in block 510. The event data and/or the historic data can be aggregated over the course of a current period of time, such as a current day. The data can be aggregated whenever new event data, such as a transfer order, is received/ingested. Sometimes, the data can be aggregated at predetermined time intervals, as described above. The data can be continuously aggregated, and also used to make predictions and/or evaluate the metric for the current day.

In block 512, the computer system can cache the aggregated data for a storage time period. The storage time period, as indicated above, can be a 60 day time period, which can correspond to the lookback time period used by the linear regression techniques. Storing the aggregated data in cache can advantageously utilize less resources and processing power than storage in the data stores. The aggregated data can be quickly and efficiently retrieved whenever the computer system makes predictions about the metric during the current day or during another current period of time.

The computer system can retrieve exclusions from a data store in block 514. The exclusions may represent known anomalous events in the history of the metric for the retail environment. The known anomalous events may have occurred over the lookback time period, such as a past 60 days. For example, the exclusions may indicate that event data and/or predictions for the metric on a particular date a month ago should be excluded from subsequent predictions because on that date, the retail environment requested an unusually high volume of replenishment items. The unusually high volume could be due to a variety of reasons, such as a sale or promotion in the retail environment, a holiday, an event, a natural disaster or storm, etc. Some types of items may generate higher-than-usual volumes, such as seasonal items that may include but are not limited to back to school items, Halloween candy, holiday decorations, etc. The exclusions may indicate exclusion of data that relates to these higher-than-usual volume items, especially if the lookback time period overlaps with a period of time at which these items are either trending with higher volumes (which means these items are in peak/high season/demand at that time) or lower volumes (which means these items are in low season/demand at that time) than other items at the retail environment.

The computer system can apply the exclusions to the cached aggregated data to exclude outliers therein (block 516). Excluding the outliers ensures that the known anomalous events are not inputs to the disclosed linear regression techniques. As a result, upper and lower bounds (e.g., upper and lower tolerance bounds) and predicted values for the metric may not be impacted by such known anomalous events. In some implementations, the exclusions may be retrieved and applied before the computer system retrieves the historic data (block 508) and/or aggregates the data (block 510). As a result, the computer system may only retrieve the historic data within the lookback time period that is not excluded. Additionally or alternatively, the computer system may only aggregate the data that is not excluded.

In block 518, the computer system can apply statistical algorithm techniques, in real-time, to the cached aggregated data for the metric over the lookback time period (block 518). The computer system can apply linear regression techniques. Applying real-time linear regression techniques to data that has been aggregated in real-time can result in compute resource usage advantages rather than taking a known linear regression model and applying it to the data whenever the data has been aggregated. The disclosed techniques are lightweight and provides accurate, real-time analysis of the metric.

The disclosed linear regression techniques, such as a model or algorithm, can describe a relationship between a dependent variable Y and an independent variable X. Linear regression techniques can model the relationship between the two variables by fitting a linear equation to observed data. A linear regression equation can include: $Y=b0+b1*X$, where Y is a dependent variable (such as a TOR quantity), X is the independent variable (such as a timestamp reference or epoch), b0 is an intercept, and b1 is a slope. A sum of squares total (SST) can be squared differences between the observed dependent variable and its mean. A sum of squares due to regression (SSR) can be a sum of the differences between the predicted value and the mean of the dependent variable. A sum of squares error (SSE) can be the difference between the observed value and the predicted value. R-squared ($R^2$) can be a statistical measure that represents the proportion of variance for a dependent variable that is explained by an independent variable. $R^2$ explains to what extent the variance of one variable explains the variance of the second variable. So, if the $R^2$ of a linear regression model is 0.50, then approximately half of the observed variation can be explained by the model's inputs. Closer to 1.0 of $R^2$ can indicate a better fit model. A Root Mean Square Error (RMSE) can be the standard deviation of residuals (prediction errors). Residuals are a measure of how far from the regression line data points are and RMSE is a measure of how spread out these residuals are, which indicates how concentrated the data is around a line of best fit. The RMSE can be used to determine symmetric positioning of the upper and lower tolerance bounds for the metric relative the predicted value.

The computer system can determine, based on applying the linear regression techniques, a predicted value and upper and lower tolerance bounds for the metric (block 520). The predicted value and bounds can be determined whenever ingested data is aggregated. Sometimes, the predicted value and bounds can be determined at timed intervals. For example, the metric can be assessed overnight for a next day. Once the next day breaks, the predicted value and the bounds for the metric may already be determined and then used for efficient daytime identification of anomalous events. Throughout the day, the prediction of the value and bounds may be re-run and/or updated (such as whenever new data is ingested and/or aggregated).

The computer system can determine, in block 522, whether one or more conditions for triggering identification of anomalies have been met. The conditions for triggering identification of the anomalies may be met once the predicted values and/or the upper and lower tolerance bounds start being consistent/the same/similar when determined (see blocks 518-520). The predicted values and the upper and lower bounds may start being the same or within threshold values of previously predicted values and bounds for the current period of time (e.g., the current day, the next day) as the current period of time progresses and the computer system ingests and aggregates more data. Since more data points may exist and be used for performing the disclosed techniques as time progresses, the computer system can generate more stable values for the predicted value and the upper and lower bounds. Thus, once those values are more stable (e.g., by comparing newly predicted values and bounds to previously-predicted values and bounds for the current period of time), the computer system may determine that the condition(s) for triggering identification of the anomalies has been met.

In some implementations, the condition(s) can be met if the computer system determines that sufficient data, in light of the exclusions, has been ingested and aggregated (see blocks 502-516). The condition(s) may vary based on how long it typically may take to build predictions for the particular metric. As an illustrative example, on average, it can take approximately 5 to 6 hours to determine stable/consistent predicted value and bounds for the particular metric, based on a comparison of historic metric predictions (over the last 60 days, during a similar or same time in a previous year, throughout history, or during any other period of time) to the currently-predicted value and bounds. The computer system can use the 5-6 hour window of time as an indicator for when to trigger identification of the anomalies in block 522. Sometimes, exclusions may apply to the time period typically used to build the predictions based on seasonality and/or holidays. For example, during a holiday, significantly more data may be ingested and aggregated. Actual values for the metric may trend out of bounds more during the holidays than typically expected on a normal day. Therefore, the computer system may determine that the identification of anomalies should be performed earlier during the holidays than during a typical, normal day.

If the condition(s) for triggering identification of anomalies have not been met in block 522, then the computer system can return to block 502 and iterate through the process 500 until the condition(s) are met. In other words, the computer system may continuously ingest data, aggregate the data, and apply the linear regression techniques to determine the predicted value and the upper and lower tolerance bounds. Any of the predicted values and the upper and lower bounds can be stored and accessible in cache for easily and quick retrieval.

If the condition(s) for triggering identification of anomalies has been met in block 522, then the computer system proceeds to block 508, in which the computer system can evaluate an actual value for the metric in the received event data based on the predicted value and the determined upper and lower bounds for the metric (block 528). The computer system can receive the actual value for the metric as part of the ingested event data in block 502. The computer system can compare the actual value to the predicted value and the bounds to determine whether the actual value is close to the predicted value, trends towards one of the bounds, and/or exceeds one of the bounds. The computer system may determine whether the actual value for the metric is evenly distributed between the upper and lower bounds relative the predicted value, which may indicate that the metric is trended as expected or normally for the current day or other current period of time.

The computer system can identify anomalies for the metric based on the evaluation (block 530). For example, the computer system can identify where the actual value for the metric trends outside of one of the upper and lower bounds. Sometimes, whenever the actual value trends outside of one of the bounds, the computer system may identify an anomaly. In some implementations, the computer system may identify an anomaly only if the actual value trends outside of one of the bounds by at least a threshold amount. The threshold amount may be used during a holiday, seasonal item sales, or other known anomalous event.

In some implementations, the computer system may pull additional data beyond the lookback time period from one or more historical data sources to use in predicting the value and the bounds as well as evaluating the actual metric against those predictions. In some implementations, the computer system may apply another linear regression model on top of the predicted value and bounds to generate more predictions, and then evaluate the actual value for the metric against the more predictions. The computer system may apply the multiple linear regression models when dealing with a time period that is seasonal and/or a holiday.

Sometimes, identifying the anomalies can include attributing the anomaly (e.g., a significant deviation of the actual value for the metric from one of the upper and lower tolerance bounds) to a particular node, such as one or more distribution centers and/or one or more retail environments. As an illustrative example, the computer system can attribute a large deviation from the upper tolerance bound to a particular distribution center and to a particular seasonality department in that distribution center, where this department knows that it is normal for the metric to trend significant out of bounds.

In block 532, the computer system can generate alerts and/or notifications indicating the identified anomalies. The alerts can be sent to relevant users to make real-time adjustments to the supply chain, based on information in the alerts. In some implementations, the alerts and/or notifications can be transmitted to devices of users that analyze performance of the computer system, what metrics are being triggered and evaluated, what anomalous activity is being identified, what alerts and/or notifications are being generated, etc. This information can be used to make adjustments to performance of and operations performed by the computer system described herein to accurately detect anomalous during runtime use.

The computer system can then return the alerts and/or notifications (block 534). The alerts and/or notifications can be transmitted to devices of relevant users (e.g., the user device(s) 104) in a network of distribution centers and retail environments. The devices may present the alerts and/or notifications in respective GUI displays. The devices may receive user input indicating on or more modifications and/or actions that may be taken to address the anomalies. Refer to at least FIGS. 1A, 1B, 4A, and 4B for further discussion.

In some implementations, any of the information determined herein, such as the predicted values and the upper and lower tolerance bounds, the identified anomalies, application of the exclusions, determinations of whether to identify anomalies, generated alerts and/or notifications, etc. may be provided back to the computer system or another computer system for iterative training and learning processes. For example, any of this information can be provided as training inputs for the linear regression techniques described herein. Sometimes, the information can be provided to teams of users in the network of distribution centers and retail environments for learning and training purposes, to learn how to identify and address anomalies as they are identified and/or before those anomalies cause supply chain issues.

Figure 6:
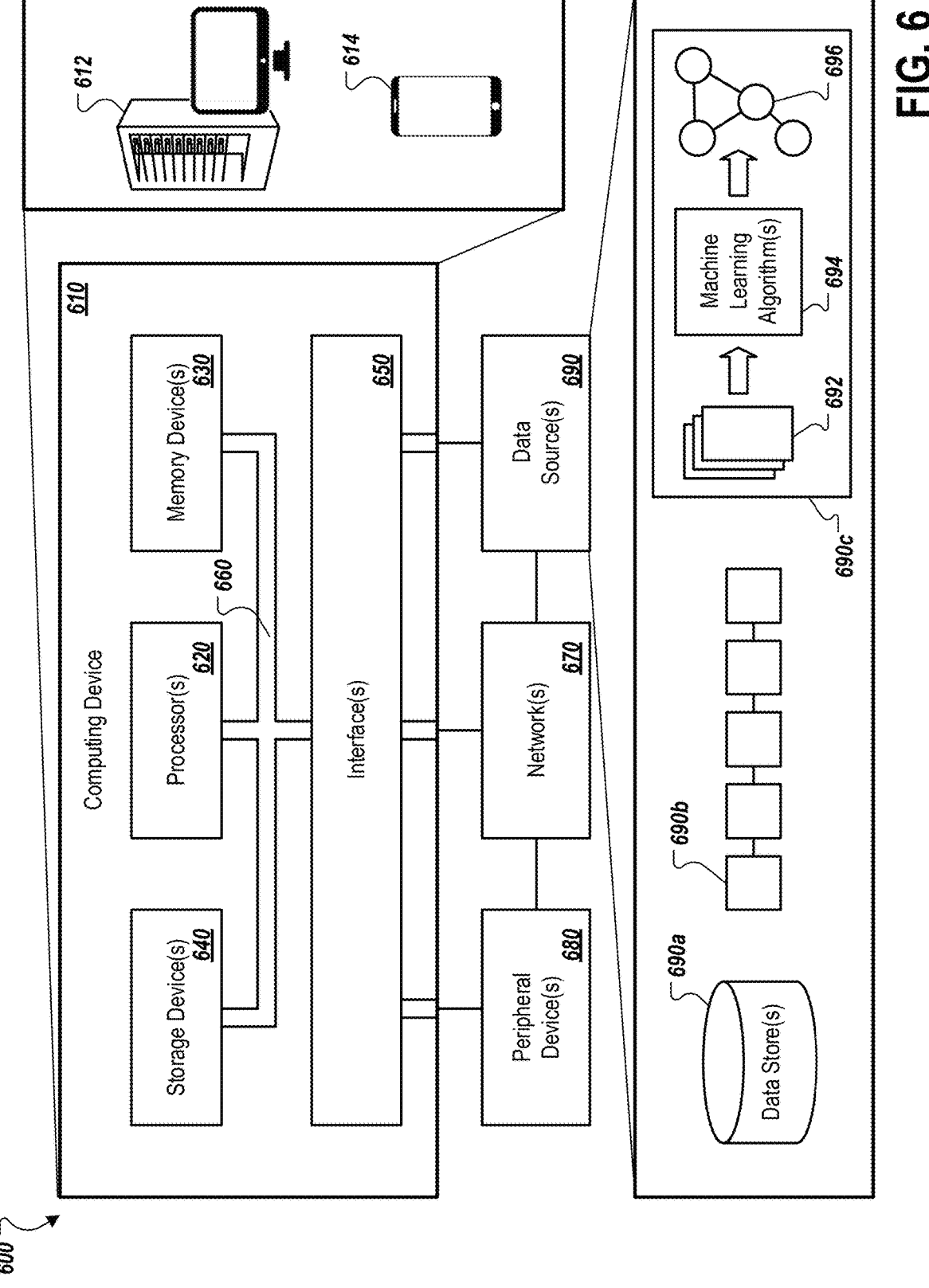
FIG. 6 is a schematic diagram that shows an example of a computing device and a mobile computing device.

FIG. 6 is a schematic diagram that shows an example of a computing system 600 that can be used to implement the techniques described herein. The computing system 600 includes one or more computing devices (e.g., computing device 610), which can be in wired and/or wireless communication with various peripheral device(s) 680, data source(s) 690, and/or other computing devices (e.g., over network(s) 670). The computing device 610 can represent various forms of stationary computers 612 (e.g., workstations, kiosks, servers, mainframes, edge computing devices, quantum computers, etc.) and mobile computers 614 (e.g., laptops, tablets, mobile phones, personal digital assistants, wearable devices, etc.). In some implementations, the computing device 610 can be included in (and/or in communication with) various other sorts of devices, such as data collection devices (e.g., devices that are configured to collect data from a physical environment, such as microphones, cameras, scanners, sensors, etc.), robotic devices (e.g., devices that are configured to physically interact with objects in a physical environment, such as manufacturing devices, maintenance devices, object handling devices, etc.), vehicles (e.g., devices that are configured to move throughout a physical environment, such as automated guided vehicles, manually operated vehicles, etc.), or other such devices. Each of the devices (e.g., stationary computers, mobile computers, and/or other devices) can include components of the computing device 610, and an entire system can be made up of multiple devices communicating with each other. For example, the computing device 610 can be part of a computing system that includes a network of computing devices, such as a cloud-based computing system, a computing system in an internal network, or a computing system in another sort of shared network. Processors of the computing device (610) and other computing devices of a computing system can be optimized for different types of operations, secure computing tasks, etc. The components shown herein, and their functions, are meant to be examples, and are not meant to limit implementations of the technology described and/or claimed in this document.

The computing device 610 includes processor(s) 620, memory device(s) 630, storage device(s) 640, and interface(s) 650. Each of the processor(s) 620, the memory device(s) 630, the storage device(s) 640, and the interface(s) 650 are interconnected using a system bus 660. The processor(s) 620 are capable of processing instructions for execution within the computing device 610, and can include one or more single-threaded and/or multi-threaded processors. The processor(s) 620 are capable of processing instructions stored in the memory device(s) 630 and/or on the storage device(s) 640. The memory device(s) 630 can store data within the computing device 610, and can include one or more computer-readable media, volatile memory units, and/or non-volatile memory units. The storage device(s) 640 can provide mass storage for the computing device 610, can include various computer-readable media (e.g., a floppy disk device, a hard disk device, a tape device, an optical disk device, a flash memory or other similar solid state memory device, or an array of devices, including devices in a storage area network or other configurations), and can provide date security/encryption capabilities.

The interface(s) 650 can include various communications interfaces (e.g., USB, Near-Field Communication (NFC), Bluetooth, WiFi, Ethernet, wireless Ethernet, etc.) that can be coupled to the network(s) 670, peripheral device(s) 680, and/or data source(s) 690 (e.g., through a communications port, a network adapter, etc.). Communication can be provided under various modes or protocols for wired and/or wireless communication. Such communication can occur, for example, through a transceiver using a radio-frequency. As another example, communication can occur using light (e.g., laser, infrared, etc.) to transmit data. As another example, short-range communication can occur, such as using Bluetooth, WiFi, or other such transceiver. In addition, a GPS (Global Positioning System) receiver module can provide location-related wireless data, which can be used as appropriate by device applications. The interface(s) 650 can include a control interface that receives commands from an input device (e.g., operated by a user) and converts the commands for submission to the processors 620. The interface(s) 650 can include a display interface that includes circuitry for driving a display to present visual information to a user. The interface(s) 650 can include an audio codec which can receive sound signals (e.g., spoken information from a user) and convert it to usable digital data. The audio codec can likewise generate audible sound, such as through an audio speaker. Such sound can include real-time voice communications, recorded sound (e.g., voice messages, music files, etc.), and/or sound generated by device applications.

The network(s) 670 can include one or more wired and/or wireless communications networks, including various public and/or private networks. Examples of communication networks include a LAN (local area network), a WAN (wide area network), and/or the Internet. The communication networks can include a group of nodes (e.g., computing devices) that are configured to exchange data (e.g., analog messages, digital messages, etc.), through telecommunications links. The telecommunications links can use various techniques (e.g., circuit switching, message switching, packet switching, etc.) to send the data and other signals from an originating node to a destination node. In some implementations, the computing device 610 can communicate with the peripheral device(s) 680, the data source(s) 690, and/or other computing devices over the network(s) 670. In some implementations, the computing device 610 can directly communicate with the peripheral device(s) 680, the data source(s), and/or other computing devices.

The peripheral device(s) 680 can provide input/output operations for the computing device 610. Input devices (e.g., keyboards, pointing devices, touchscreens, microphones, cameras, scanners, sensors, etc.) can provide input to the computing device 610 (e.g., user input and/or other input from a physical environment). Output devices (e.g., display units such as display screens or projection devices for displaying graphical user interfaces (GUIs)), audio speakers for generating sound, tactile feedback devices, printers, motors, hardware control devices, etc.) can provide output from the computing device 610 (e.g., user-directed output and/or other output that results in actions being performed in a physical environment). Other kinds of devices can be used to provide for interactions between users and devices. For example, input from a user can be received in any form, including visual, auditory, or tactile input, and feedback provided to the user can be any form of sensory feedback (e.g., visual feedback, auditory feedback, or tactile feedback).

The data source(s) 690 can provide data for use by the computing device 610, and/or can maintain data that has been generated by the computing device 610 and/or other devices (e.g., data collected from sensor devices, data aggregated from various different data repositories, etc.). In some implementations, one or more data sources can be hosted by the computing device 610 (e.g., using the storage device(s) 640). In some implementations, one or more data sources can be hosted by a different computing device. Data can be provided by the data source(s) 690 in response to a request for data from the computing device 610 and/or can be provided without such a request. For example, a pull technology can be used in which the provision of data is driven by device requests, and/or a push technology can be used in which the provision of data occurs as the data becomes available (e.g., real-time data streaming and/or notifications). Various sorts of data sources can be used to implement the techniques described herein, alone or in combination.

In some implementations, a data source can include one or more data store(s) 690*a*. The database(s) can be provided by a single computing device or network (e.g., on a file system of a server device) or provided by multiple distributed computing devices or networks (e.g., hosted by a computer cluster, hosted in cloud storage, etc.). In some implementations, a database management system (DBMS) can be included to provide access to data contained in the database(s) (e.g., through the use of a query language and/or application programming interfaces (APIs)). The database(s), for example, can include relational databases, object databases, structured document databases, unstructured document databases, graph databases, and other appropriate types of databases.

In some implementations, a data source can include one or more blockchains 690*b*. A blockchain can be a distributed ledger that includes blocks of records that are securely linked by cryptographic hashes. Each block of records includes a cryptographic hash of the previous block, and transaction data for transactions that occurred during a time period. The blockchain can be hosted by a peer-to-peer computer network that includes a group of nodes (e.g., computing devices) that collectively implement a consensus algorithm protocol to validate new transaction blocks and to add the validated transaction blocks to the blockchain. By storing data across the peer-to-peer computer network, for example, the blockchain can maintain data quality (e.g., through data replication) and can improve data trust (e.g., by reducing or eliminating central data control).

In some implementations, a data source can include one or more machine learning systems 690c. The machine learning system(s) 690c, for example, can be used to analyze data from various sources (e.g., data provided by the computing device 610, data from the data store(s) 690a, data from the blockchain(s) 690b, and/or data from other data sources), to identify patterns in the data, and to draw inferences from the data patterns. In general, training data 692 can be provided to one or more machine learning algorithms 694, and the machine learning algorithm(s) can generate a machine learning model 696. Execution of the machine learning algorithm(s) can be performed by the computing device 610, or another appropriate device. Various machine learning approaches can be used to generate machine learning models, such as supervised learning (e.g., in which a model is generated from training data that includes both the inputs and the desired outputs), unsupervised learning (e.g., in which a model is generated from training data that includes only the inputs), reinforcement learning (e.g., in which the machine learning algorithm(s) interact with a dynamic environment and are provided with feedback during a training process), or another appropriate approach. A variety of different types of machine learning techniques can be employed, including but not limited to convolutional neural networks (CNNs), deep neural networks (DNNs), recurrent neural networks (RNNs), and other types of multi-layer neural networks.

Various implementations of the systems and techniques described herein can be realized in digital electronic circuitry, integrated circuitry, specially designed ASICs (application specific integrated circuits), computer hardware, firmware, software, and/or combinations thereof. A computer program item can be tangibly embodied in an information carrier (e.g., in a machine-readable storage device), for execution by a programmable processor. Various computer operations (e.g., methods described in this document) can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, by a computer to perform a certain activity or bring about a certain result. A computer program can be written in any form of programming language, including compiled or interpreted languages, and can be deployed in any form, including as a stand-alone program or as a module, component, subroutine, or other unit suitable for use in a computing environment. A computer program item can be a computer- or machine-readable medium, such as a storage device or memory device. As used herein, the terms machine-readable medium and computer-readable medium refer to any computer program item, apparatus and/or device (e.g., magnetic discs, optical disks, memory, etc.) used to provide machine instructions and/or data to a programmable processor, including a machine-readable medium that receives machine instructions as a machine-readable signal. The term machine-readable signal refers to any signal used to provide machine instructions and/or data to a programmable processor.

Suitable processors for the execution of a program of instructions include, by way of example, both general and special purpose microprocessors, and can be a single processor or one of multiple processors of any kind of computer. Generally, a processor will receive instructions and data from a read-only memory or a random access memory or both. The elements of a computer are a processor for executing instructions and one or more memory devices for storing instructions and data. Generally, a computer can also include, or can be operatively coupled to communicate with, one or more mass storage devices for storing data files. Such devices can include magnetic disks (e.g., internal hard disks and/or removable disks), magneto-optical disks, and optical disks. Storage devices suitable for tangibly embodying computer program instructions and data can include all forms of non-volatile memory, including by way of example semiconductor memory devices, flash memory devices, magnetic disks (e.g., internal hard disks and removable disks), magneto-optical disks, and optical disks. The processor and the memory can be supplemented by, or incorporated in, ASICs (application-specific integrated circuits).

The systems and techniques described herein can be implemented in a computing system that includes a back end component (e.g., a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). The computer system can include clients and servers, which can be generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A system for real-time detection and remediation of metric anomalies in a replenishment network, the system comprising:
   a data store configured to maintain historic metric data associated with a plurality of retail environments and distribution centers in a replenishment network;
   a cache data store configured to temporarily maintain aggregated data for a particular metric of a particular retail environment;
   a plurality of data sources, each configured to generate event data about real-time activities occurring in the replenishment network; and
   a computer system in data communication with the data store, the cache data, and the plurality of data sources, wherein the computer system comprises one or more processors and memory storing instructions that, when executed, cause the one or more processors to perform operations comprising:
      receiving, from the plurality of data sources, the event data;
      retrieving, from the data store, the historic metric data associated with the particular metric of the particular retail environment for a predetermined lookback period of time;
      aggregating the event data and the historic metric data into aggregated data for the particular metric;
      caching the aggregated data in the cache data store for real-time prediction modeling that uses minimum available compute resources and processing power of the one or more processors;
      determining, based on applying a model to the cached aggregated data in real-time, (i) a real-time predicted value for the metric of the retail environment and (ii) upper and lower tolerance bounds for the metric of the retail environment;
      in real-time: iteratively receiving the event data, aggregating the event data and the historic metric data, and determining (i) and (ii) until either (a) determining that a condition is triggered to evaluate the particular metric for the particular retail environment or (b) expiration of a time period to which the real-time predicted value and the upper and lower tolerances apply;
      generating, based on a determination that the condition is triggered to evaluate the particular metric, information about one or more anomalies for the particular metric; and
      returning the information to a computing device associated with at least one of the plurality of distribution centers to cause the computing device to automatically remediate the one or more anomalies.

2. The system of claim 1, wherein the operations further comprise: performing, based on a determination that the condition is triggered to evaluate the particular metric, an evaluation of the particular metric, wherein performing the evaluation comprises:
   receiving, in the event data, an actual value for the particular metric,
   comparing the actual value to the real-time predicted value and the upper and lower tolerance bounds,
   determining whether the actual value trends outside of at least one of the upper and lower tolerance bounds relative the real-time predicted value, and generating evaluation results based on a determination that the actual value trends outside of at least one of the upper and lower tolerance bounds relative the real-time predicted value.

3. The system of claim 2, wherein the operations further comprise:
   identifying, based on the evaluation results from performing the evaluation of the particular metric, the one or more anomalies for the particular metric; and
   returning the information about the one or more anomalies for the particular metric.

4. The system of claim 1, wherein the particular metric comprises a quantity of items to be ordered to the particular retail environment.

5. The system of claim 4, wherein the quantity of items to be ordered is for a current day.

6. The system of claim 4, wherein the quantity of items to be ordered is for a next day.

7. The system of claim 1, wherein the cache data store is configured to temporarily maintain the aggregated data for 60 days.

8. The system of claim 1, wherein the predetermined lookback period of time is a past 60 days.

9. The system of claim 1, wherein returning the information about the one or more anomalies for the particular metric comprises transmitting the information to one or more computing devices of relevant users in the replenishment network, wherein the one or more computing devices are configured to (i) present the information in respective graphical user interface (GUI) displays and (ii) receive respective user input indicating at least one action to be taken in the replenishment network to address the one or more anomalies.

10. The system of claim 9, wherein the at least one action to be taken in the replenishment network to address the one or more anomalies comprises adjusting the quantity of items to be picked and delivered from a distribution center for order replenishment to the particular retail environment.

11. The system of claim 1, wherein the plurality of data sources comprise a scheduler computer system configured to (i) generate an order request for items to be delivered to the retail environment based at least in part on historic data indicating orders that were previously delivered to the retail environment and (ii) transmit the order request to the computer system.

12. The system of claim 11, wherein the plurality of data source comprise a distribution center computer system associated with at least one distribution center in the replenishment network,
   wherein the distribution center computer system is configured to:
      receive the order request from the scheduler computer system;
      schedule one or more orders for fulfilling the order request to the retail environment; and
      transmit data corresponding to the scheduled orders to the computer system.

13. The system of claim 12, wherein the computer system is configured to perform the operations while the distribution center computer system is scheduling the one or more orders to fulfill the order request to the retail environment.

14. The system of claim 12, wherein the system further comprises a computing device of a relevant user associated with the at least one distribution center,
   wherein the computer system is configured to transmit the information about the one or more anomalies to the computing device while the distribution center computer system is scheduling the one or more orders to fulfill the order request to the retail environment, and wherein the computing device is configured to:

present the information in a respective GUI display at the computing device;

receive, at the computing device, user input indicating one or more modifications to the orders that are being scheduled by the distribution center computer system; and execute instructions based on the user input to modify the orders that are being scheduled by the distribution center computer system.

15. The system of claim 14, wherein the distribution center computer system is further configured to:

receive the modified orders from the computing device of the relevant user;

generate order fulfillment instructions based on the modified orders, wherein the order fulfillment instructions are for execution in the at least one distribution center; and return the order fulfillment instructions for automatic execution by one or more computing systems in the at least one distribution center.

16. The system of claim 1, wherein the operations further comprise:

identifying, using an API, one or more exclusions to apply to the event data and the historic metric data;

applying the identified exclusions to the event data and the historic metric data to remove outlier data points and generate cleaned data; and aggregating the cleaned data into the aggregated data for the particular metric.

17. The system of claim 1, wherein the operations further comprise:

identifying, using an API, one or more exclusions to apply to the event data and the historic metric data;

applying the identified exclusions to the cached aggregated data to remove outlier data points therein and generate cleaned data; and determining, based on applying the statistical algorithms model to the cleaned data, (i) the real-time predicted value for the metric of the retail environment and (ii) the upper and lower tolerance bounds for the metric of the retail environment.

18. The system of claim 1, wherein:

the event data is received, by the computer system, at different times from the plurality of data sources, and the computer system is configured to aggregate the event data and the historic metric data in response to identifying, by a topics listener, a triggering event amongst the received event data, the triggering event indicating the metric of the retail environment.

19. The system of claim 1, wherein the statistical algorithms model comprises a linear regression model.

20. The system of claim 1, wherein the statistical algorithms model was trained using historic data associated with the replenishment network to generate (i) the real-time predicted value for the particular metric and (ii) a root means square error (RMSE) value, wherein the RMSE value is used, during runtime by the computer system, to determine a symmetrical distribution of values between the upper and lower tolerance bounds relative the real-time predicted value for the particular metric.

\*  \*  \*  \*  \*